US006674545B1

(12) United States Patent
Atsumi

(10) Patent No.: US 6,674,545 B1
(45) Date of Patent: Jan. 6, 2004

(54) IMAGE FORMATION MANAGEMENT SYSTEM WHICH MANAGES IMAGE FORMATIONS PERFORMED BY A PLURALITY OF IMAGE FORMING APPARATUS

(75) Inventor: Tomoyuki Atsumi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/104,989

(22) Filed: Jun. 26, 1998

(30) Foreign Application Priority Data

Jun. 27, 1997 (JP) .......................................... 9-171718

(51) Int. Cl.[7] .......................................... G06F 15/00

(52) U.S. Cl. ...................... 358/1.9; 358/1.14; 358/1.15; 358/468

(58) Field of Search ................................ 358/1.9, 1.15, 358/1.14, 368, 437, 440, 442, 443; 374/100.01–100.15

(56) References Cited

U.S. PATENT DOCUMENTS 4,497,037 A * 1/1985 Kato et al. .................. 364/900
4,891,836 A * 1/1990 Takahashi .................. 379/100
4,956,721 A * 9/1990 Tasaki et al. ............... 358/402
5,066,977 A * 11/1991 Yoshizuka ..................... 11/91
5,202,989 A * 4/1993 Hirosawa .................... 395/650
5,224,157 A 6/1993 Yamada et al. ............. 379/100
5,434,650 A * 7/1995 Nakahara et al. ........... 355/202
5,740,490 A * 4/1998 Yamashita et al. ............. 399/8
6,064,836 A * 5/2000 Nakamura et al. ............. 399/8
6,334,108 B1 * 12/2001 Deaton et al. ................ 705/14

FOREIGN PATENT DOCUMENTS

JP 61-51166 3/1986 .......... G03G/15/00
JP 3-255466 11/1991 .......... G03G/15/00

* cited by examiner

*Primary Examiner*—Thomas D. Lee
(74) *Attorney, Agent, or Firm*—Burns, Doane, Swecker & Mathis, LLP

(57) ABSTRACT

The management apparatus is connected to a plurality of image forming apparatuses via a network and manages the amount of image formations made by separate users using the plurality of image forming apparatuses. The management apparatus includes the amount of image formations distribution unit which distributes the amount of image formations allocated to each user among the plurality of image forming apparatuses in accordance with the first ratio and the distributed amount transmission control unit which transmits a respective amount of image formations associated with the user together with the identification information of the user to each of the plurality of image forming apparatuses.

22 Claims, 28 Drawing Sheets

Fig. 4

TRANSMISSION TABLE 1

| ID | KEY CODE | REASSIGNMENT |
|---|---|---|
| D | 1 2 3 4 | 7 0 |
| A | 1 2 3 4 | 5 1 3 |
| B | 1 2 3 4 | 2 6 3 |
| C | 1 2 3 4 | 1 7 0 |
| . | . | . |
| . | . | . |
| . | . | . |
| . | . | . |

Fig. 5

TRANSMISSION TABLE 2

| ID | KEY CODE |
|---|---|
| A | 1 2 3 4 |
| B | 1 2 3 4 |
| C | 1 2 3 4 |
| D | 1 2 3 4 |
| • | • |
| • | • |
| • | • |
| • | • |

IMAGE FORMATION MANAGEMENT SYSTEM WHICH MANAGES IMAGE FORMATIONS PERFORMED BY A PLURALITY OF IMAGE FORMING APPARATUS

This application is based on application No. 09-171718 filed in Japan, the content of which is hereby incorporated by reference.

BACKGROUND OF THE INVENTION (1) Field of the Invention

The present invention relates to an apparatus which manages the image formations performed by an image forming apparatus, and especially relates to an apparatus which manages the total amount of image formations performed by a plurality of image forming apparatuses on a user basis, with the plurality of image forming apparatuses being used by a plurality of users.

(2) Related Art

In organizations such as companies, a budget for each section is easily managed by allocating a different number of copies to each section per certain period of time. Various management apparatuses may be used for this kind of management.

Japanese Laid-Open Patent Application No. 61-51166 teaches an example of a management apparatus which manages the number of copies performed by one copier on a user basis and which prohibits copy operations when the number of copies made by a user reaches the number of the copies allocated to the user.

Similarly, Japanese Laid-Open Patent Application No. 3-255466 teaches an example of a management apparatus which manages the number of copies made by users on a plurality of copiers. This management apparatus regularly accumulates the number of copies performed by all of the plurality of copiers for each user, and prohibits copy operations by any copier when the number of copies made by a user reaches the number of copies allocated to that user.

The management apparatus disclosed in Japanese Laid-Open Patent Application No. 61-51166 can be used in the case when only one copier is subjected to the management. Therefore, it is hard to manage the number of copies allocated to a user who may use a plurality of copiers.

The management apparatus disclosed in Japanese Laid-Open Patent Application No. 3-255466 judges whether the number of copies made by the user has reached the number of copies allocated to the user by accumulating the number of copies made by the user only when the certain period of time elapses. As such, the user can continue to make copies until the certain period of time elapses, despite having used up the allocated number. Consequently, the total number of copies made by the user may substantially exceed the allocated number of copies, thereby exceeding the budgeted cost.

SUMMARY OF THE INVENTION

The object of the present invention is to provide a management apparatus which properly manages the amount of image formations made by the user who uses the plurality of copiers and which securely prohibits the image formation when the amount of image formations made by the user reaches the amount of image formations allocated to the user.

This object can be achieved by a management apparatus which is connected to a plurality of image forming apparatuses via a communication line and manages an amount of image formations performed by at least one of users using the plurality of image forming apparatuses, the management apparatus made up of: an amount of image formations distribution unit for distributing an amount of image formations allocated to a specific user among the plurality of image forming apparatuses in accordance with a first ratio; and a distributed amount transmission unit for transmitting a respective distributed amount of image formations to each image forming apparatus.

The object can be also achieved by a management method for a management apparatus which is connected to a plurality of image forming apparatuses via a communication line and manages an amount of image formations performed by at least one of users using the plurality of image forming apparatuses, the management method including: an amount of image formations distribution step for distributing an amount of image formations allocated to a specific user among the plurality of image forming apparatuses in accordance with a first ratio; and a distributed amount transmission step for transmitting a respective distributed amount of image formations to each image forming apparatus.

Also, the object can be achieved by a management system where a plurality of image forming apparatuses are connected to a management apparatus via a communication line, for managing an amount of image formations made by a specific user, wherein the management apparatus made up of: an amount of image formations distribution unit for distributing an amount of image formations allocated to a specific user among the plurality of image forming apparatuses in accordance with a first ratio; and a distributed amount transmission unit for transmitting a respective distributed amount of image formations to each image forming apparatus, and wherein each image forming apparatus made up of: a storage unit for storing a distributed amount of image formations associated with a specific user, with the distributed amount of image formations being transmitted from the management apparatus; an amount of image formations counting unit for counting an amount of image formations made by the specific user using the image forming apparatus; and a prohibiting unit for prohibiting the specific user from using the image forming apparatus when an amount of image formations counted by the amount of image formations counting unit reaches the distributed amount of image formations stored in the storage unit.

With this structure, when the amount of image formations, such as the number of image formations or the fee for image formations, is managed for the specific user who uses a plurality of image forming apparatuses, the sum of the amounts of image formations distributed to the plurality of image forming apparatuses does not exceed the amount of image formations allocated to the specific user. As a result, the image formation is securely prohibited when the amount of image formations made by the specific user reaches the amount of image formations allocated to the specific user.

Also, the object of the present invention can be achieved by the management apparatus further made up of: a detection unit for detecting a reception of a redistribution request issued for the specific user, with the redistribution request being transmitted from one of the plurality of image forming apparatuses; an amount of image formations redistribution unit for redistributing the amount of image formations previously allocated to the specific user among the plurality of image forming apparatuses according to a second ratio when the reception of the redistribution request is detected; and a redistributed amount transmission unit for transmitting a respective redistributed amount of image formations to each image forming apparatus.

By means of the redistribution of the amount of image formations, a problem, such as where an image forming apparatus which is often used by the specific user cannot be used, can be avoided. In addition, the amount of image formations made by the specific user does not exceed the amount of image formations allocated to the specific user.

BRIEF DESCRIPTION OF THE DRAWINGS

These and other objects, advantages and features of the invention will become apparent from the following description thereof taken in conjunction with accompanying drawings which illustrate a specific embodiment of the invention. In the drawings:

FIG. 4 shows an example of a transmission table 1;

FIG. 5 shows an example of a transmission table 2;

DESCRIPTION OF PREFERRED EMBODIMENTS

The following is a description of an embodiment of the present invention, with reference to the drawings.

(1) Brief Description of System

Figure 1:
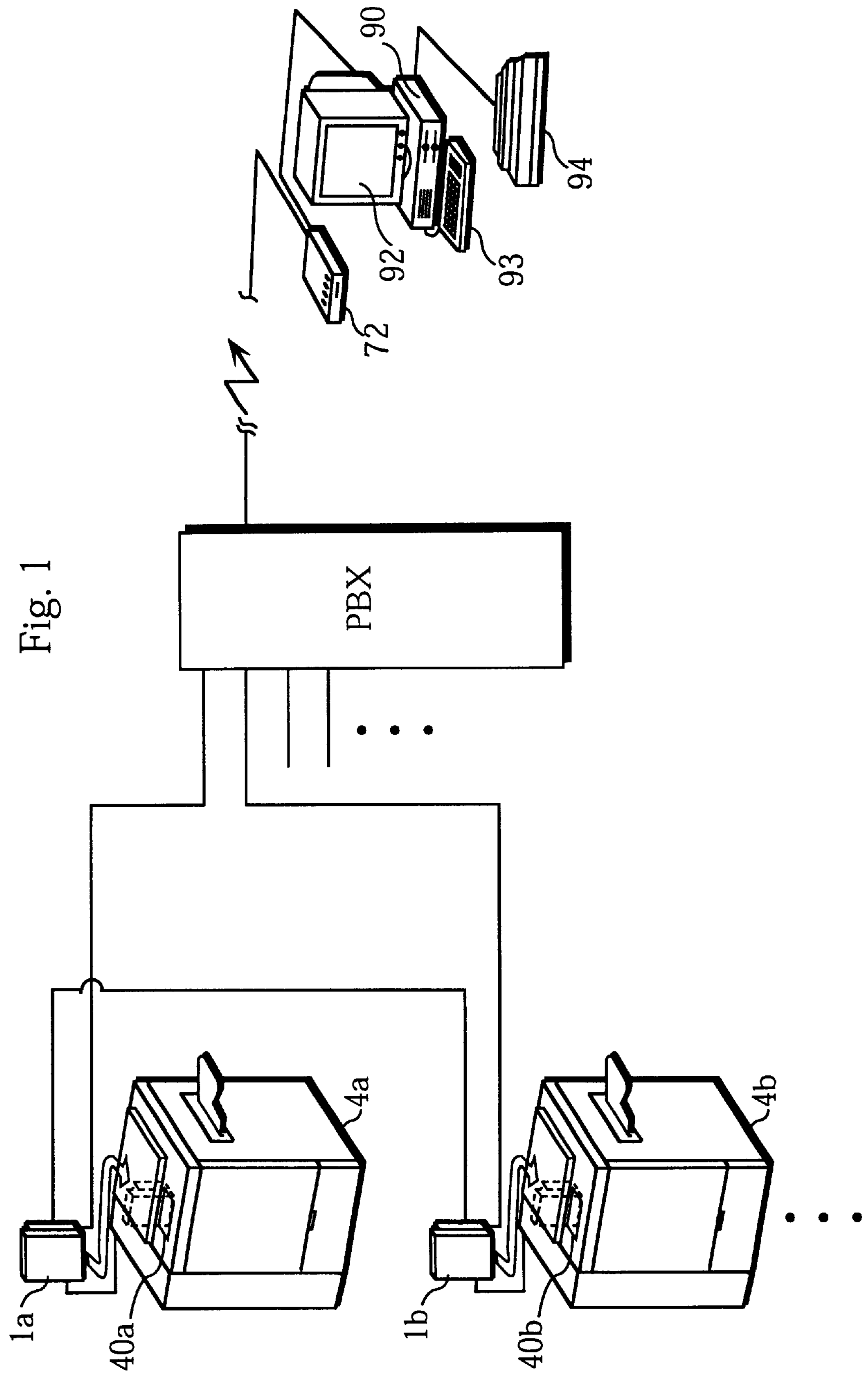
FIG. 1 shows an overall structure of a network system of an embodiment.

FIG. 1 shows a network system including a management apparatus and image forming apparatuses of the present embodiment. In the present example, copiers are used as the image forming apparatuses. In this network system shown in FIG. 1, a plurality of copiers 4*a*, 4*b*, . . . are connected to management terminals 1*a*, 1*b*, . . . that are in turn connected via a communication line network to a host computer 90 which serves as a management apparatus.

The copiers 4*a*, 4*b*, . . . are user side copiers and the host computer 90 is provided in a remote service center. It should be noted here that the number of copiers subjected to management may be two or more.

The communication line network includes an analog private branch exchange (referred to as the "PBX"hereinafter). Each of the management terminals 1*a*, 1*b*, . . . is connected via modems to the PBX that is in turn connected via an outside line to the host computer 90. Although the host computer 90 is separately provided in the present embodiment, one of the copiers that are connected via the PBX may be provided with a management apparatus that fulfils the role of the host computer 90. In addition, a PBX does not need to be used in the communication line network. For example, each management terminal of the copiers may be connected to the host computer 90 via a direct telephone line or an intranet.

The present embodiment is described based on the following premises. The plurality of copiers 4*a*, 4*b*, . . . are used by a plurality of users. The total number of copies to be made by all users within a certain period of time is predetermined for budgetary purposes within an organization such as a company, and each user is allocated a number of copies within a certain period of time in accordance with the total number of copies (hereinafter, the number of copies allocated to each user is referred to as the "user quota"). As one example, in the present embodiment, a user quota is allocated to each user at the beginning of each month, with the limited-time being a month.

It should be noted here that each user may be an individual, or a section or other such group in an organization such as a company.

Under these premises, the plurality of users may make use of each of the plurality of copiers 4*a*, 4*b* . . . , so that the number of copies that each user makes using the plurality of copiers 4$a$ 4$b$, . . . cannot be managed by each copier. For this reason, the number of copies that each user makes needs to be restricted to the respective user quota by the host computer 90 which is capable of managing all of the plurality of copiers 4$a$, 4$b$, . . . . In the present invention, the user quota for each user is distributed among the plurality of copiers 4$a$, 4$b$, . . . by the host computer 90 according to a certain distribution ratio (hereinafter, the number of copies respectively distributed to each copier is referred to as the "assignment"). It should be obvious that the sum of the assignments does not exceed the user quota allocated to the user who uses the plurality of copiers 4$a$, 4$b$, . . . .

The certain distribution ratio is determined according to a past use record of the user for -each of the copiers 4$a$, 4$b$, . . . . When the number of copies that the user has made using one of the plurality copiers 4$a$, 4$b$, . . . reaches the corresponding assignment, the host computer 90 calculates the number of copies that the user can still make (referred to as the "current remaining number of copies") by subtracting the total number of copies that the user has already made from the user quota. The host computer 90 then distributes this current remaining number of copies among the plurality of copiers 4$a$, 4$b$, . . . . It should be noted here that each user is assigned a key code composed of a four-digit number as identification information and that each management terminal is assigned a management terminal ID composed of a letter of the alphabet.

When distributing the user quota, the host computer 90 does not need to assign a number of copies to every copier in the system, so that only a certain number of copiers may be given an assignment. The user quota for different users may also be distributed to different combinations of copiers.

(2) System Components

The following is a detailed description of the constructions of the main components of the system, i.e., the host computer 90, the management terminals 1$a$, 1$b$, . . . , and the copiers 4$a$, 4$b$, . . . .

(2-1) Host Computer

(2-1-1) Hardware Construction

Figure 2:
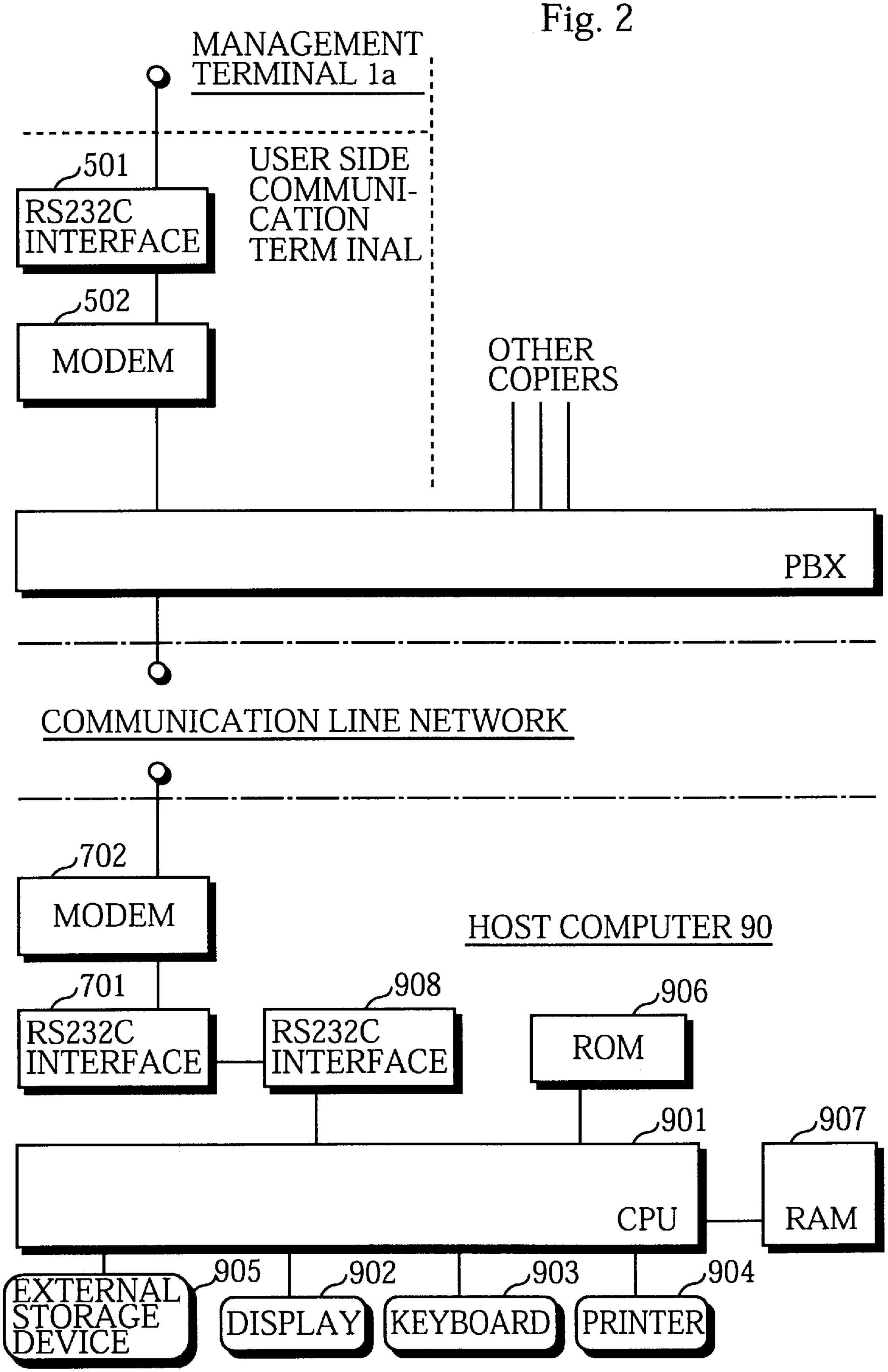
FIG. 2 shows a hardware construction of the network system.

FIG. 2 shows the hardware construction of the network system. For the sake of convenience, only the management terminal la is illustrated as one example in FIG. 2. The management terminal la is connected to a user communication terminal which is composed of an RS232C interface 501 and a modem 502, with the modem 502 being connected to the PBX. The host computer 90 is composed of a CPU 901 for performing various kinds of operations, a display 902, a keyboard 903, a printer 904, an external storage device 905 such as a hard disk drive or a floppy disk drive, a ROM 906 storing programs for various control operations, a RAM 907 serving as a work area, a modem 702 for communicating with the PBX, an RS232C interface 701 connected to the modem 702, and an RS232C interface 908 connected to the RS232C interface 701.

With this construction, the host computer 90 manages the number of copies for each user in accordance with a program that is read by the external storage device 905. More specifically, the host computer 90 determines the assignment of each copier 4$a$, 4$b$, . . . out of the user quota of each user and outputs information to the management terminals 1$a$, 1$b$, . . . of each copier 4$a$, 4$b$, . . . . In the information set to a given copier, the assignment for the given copier for a user is shown corresponding to the key code of the user. The host computer 90 requests the management terminals 1$a$, 1$b$, . . . to transmit respective management data X in which the number of copies that each user has made using each copier since the beginning of the certain period of time is recorded. In accordance with the management data X, the host computer 90 calculates both the number of copies that each user has made using each copier and the total number of copies made by each user. In addition, the host computer 90 further distributes the current remaining number of copies as necessary. Using the total number of copies that the user has made, the host computer 90 calculates the amount billed for each user at the end of month, for example, and then prints out the bill. It should be noted here that registration and deletion of a user and a copier used by the users can be executed by the host computer 90.

(2-1-2) Functional Components

Figure 3:
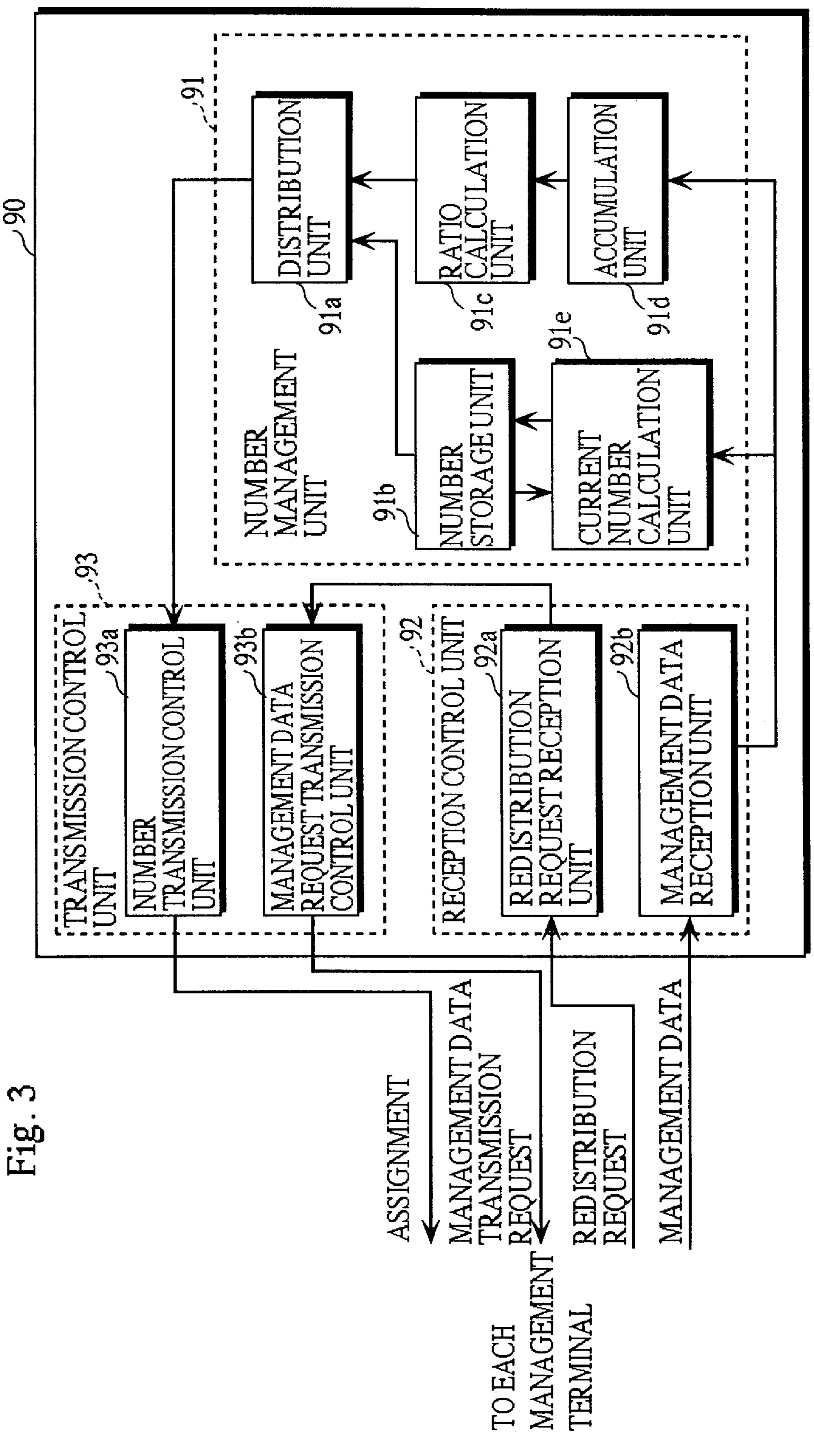
FIG. 3 is a block diagram showing a functional construction of the host computer.

Although the host computer 90 has various functions, such as printing out the bills, only the functions related to the present invention are explained here. FIG. 3 is a block diagram showing the functional construction of the host computer 90, while showing processing flows in the host computer 90 for each functional component.

When divided into functional components, the host computer 90 is composed of a number management unit 91 for distributing the user quota among the copiers 4$a$, 4$b$, . . . according to the certain distribution ratio for each user, a reception control unit 92 for controlling data reception from the management terminals 1$a$, 1$b$, . . . , and a transmission control unit 93 for controlling data transmission to the management terminals 1$a$, 1$b$, . . . .

(2-1-2a) Reception Control Unit

The reception control unit 92 includes a redistribution request reception unit 92$a$ and a management data reception unit 92$b$. The redistribution request reception unit 92$a$ receives a redistribution request from the management terminals 1$a$, 1$b$, . . . for the distribution of the current remaining number of copies for a specific user. When receiving the redistribution request, the redistribution request reception unit 92$a$ sets a transmission request flag 2 for the specific user. Note that the transmission request flag 2 indicates that the host computer 90 needs to transmit a request for the management data transmission to the management terminals 1$a$, 1$b$, . . . .

The management data reception unit 92$b$ receives the management data X respectively transmitted from the management terminals 1$a$, 1$b$, . . . and transmits the received management data X to an accumulation unit 91$d$ and a current number calculation unit 91$e$. When receiving the management data X from one of the management terminals 1$a$, 1$b$, . . . that are respectively connected to the copiers 4$a$, 4$b$, . . . , the management data reception unit 92$b$ sets an update flag for the management terminal ID representing the management terminal. Note that the update flag is used for judging whether the management data X has been received from all of the management terminals 1$a$, 1$b$, .When the update flag is respectively set for all of the management terminals 1$a$, 1$b$, . . . , the management data reception unit 92$b$ resets all of the update flags and sets a redistribution request flag. The redistribution request flag is used for judging whether number of copies redistribution processing needs to be performed by the number management unit 91 (described later).

(2-1-2b) Number Management Unit

The number management unit 91 includes a distribution unit 91$a$, a number storage unit 91$b$, a ratio calculation unit 91$c$, an accumulation unit 91$d$, and a current number calculation unit 91$e$.

The number storage unit 91$b$ stores the number of copies that each user can presently make. It should be noted here that a manager inputs the user quota for each user for the month in question to the number storage unit 91*b* at the beginning of the month. When the current number calculation unit 91*e* (described later) calculates a current remaining number of copies for a specific user, the number storage unit 91*b* also stores the current remaining number of copies.

The accumulation unit 91*d* calculates the number of copies made by each user over a specified preceding period, such as the past three months, and stores this number of copies for each copier. These totals are obtained using the number of copies included in the management data X respectively transmitted from the management terminals 1*a*, 1*b*, . . . .

The ratio calculation unit 91*c*, calculates the distribution ratio in accordance with the past use record of the user for each copier stored in the accumulation unit 91*d*. The user quota is distributed among the copiers 4*a*, 4*b*, . . . based on this distribution ratio.

As one example, suppose that the past,use record of user H using copiers A, B, C, and D in the,past three month is as follows:

25,000 copies using the copier A;

10,000 copies using the copier B;

3,000 copies using the copier C; and 0 copies using the copier D.

In accordance with this past use record of user H, the ratio calculation unit 91*c* calculates the distribution ratio for user H at:

65.8% for the copier A;

26.3% for the copier B;

7.9% for the copier C; and

0% for the copier D (hereinafter, this ratio is referred to as the "distribution ratio (1)").

The current number calculation unit 91*e* calculates the current remaining number of copies for each user, using the management data X respectively transmitted from the management terminals 1*a*, 1*b*, .More specifically, the current number calculation unit 91*e* obtains the current remaining number of copies by subtracting the total number of copies already made by a specific user using all of the copiers 4*a*, 4*b*, . . . from the user quota of the specific user stored in the number storage unit 91*b*. Here, the total number of copies already performed is obtained by accumulating the number of copies included in the management data X respectively transmitted from the management terminals 1*a*, 1*b*, . . . .

When the redistribution request flag is set for a specific user, the distribution unit 91*a* executes calculation processing for distributing the user quota or the current remaining number of copies stored in the number storage unit 91*b* in accordance with the distribution ratio calculated by the ratio calculation unit 91*c*. After this calculation processing, the distribution unit 91*a* resets the redistribution request flag and sets a transmission request flag 1. The transmission request flag 1 indicates that the reassignments need to be respectively transmitted to the management terminals 1*a*, 1*b*, . . . .

Note that the distribution unit 91*a* distributes at least a minimum number of copies to each of the copiers 4*a*, 4*b*, . . . . This is to say, the distribution unit 91*a* does not distribute the number of copies for all users using the distribution ratios calculated by the ratio calculation unit 91*c*. For example, suppose that the distribution ratio (1) is calculated by the ratio calculation unit 91*c* for user H, whose user quota stored in the number storage unit 91*b* is 1,000 copies. Here, the distribution calculation is performed as follows. Note that this distribution calculation is performed at the beginning of each month when the user quota is set.

Suppose that each of the copiers 4*a*, 4*b*, . . . is distributed at least 10% of the user quota. By doing so, user H will always be able to make a copy using any of the copiers, which is convenient for users. More specifically, the copier D with no past use by user H is also distributed 10% of the user quota. Although the distribution ratio for the copier C obtained from the past use record of user H is below 10%, the copier C is still distributed 10% of the user quota. Accordingly, the numbers of copies respectively distributed to the copiers A, B, C, and D are calculated as follows.

D: 1,000×0.1=100

C: 1,000×0.1=100

B: 1,000×0.236=263

A: 1,000−(100+100+263)=537

When the number of copies is redistributed among the copiers A, B, C, and D, the following calculation is performed. Suppose that user H has made: 137 copies using the copier A; 63 copies using the copier B; 100 copies using the copier C; and 0 copy using the copier D.

This is to say, the current remaining numbers of copies that user H can make are: 400 copies using the copier A; 200 copies using the copier B; 0 copy using the copier C; and 100 copies using the copier D.

When the redistribution of the number of copies is requested from the management terminal of the copier C, the current number calculation unit 91*e* calculates the current remaining number of copies at 700 and stores this current remaining number of copies in the number storage unit 91*b*. The distribution unit 91*a* redistributes this current remaining number of copies among the copiers A, B, C, and D, so that at least 10% of the current remaining number is distributed to each copier, as described below. It should be noted here that the sum of the reassignments as the result of the redistribution is kept equivalent to the user quota allocated to user H, i.e., 1,000 copies, by adding the number of copies that user H has made using each copier to the corresponding number of copies redistributed from the current remaining number. As a result, in each management terminal, the reassignment can be easily compared with the number of copies having been made. The reassignment for each of the copiers A, B, C, and D is calculated as follows.

D: 700×0.1+0=70

C: 700×0.1+100=170

B: 700×0.263+63=247

A: 700−(70+70+184)+137=513

It should be noted here that although 10% of the number of copies stored in the number storage unit 91*b* is distributed as the minimum to all of the copiers in the present embodiment, the minimum may be another value. For example, 10% of a ratio by which the number of copies is evenly distributed among the copiers in use may be set as the minimum. In the present example, the ratio by which the number of copies is evenly distributed among the four copiers is 25%, 10% of which, that is, 2.5%, may be set as the minimum. Alternatively, a minimum number of copies may be predetermined, so that all of the copiers are distributed at least the minimum number of copies.

Although the distribution unit 91*a* distributes the user quota among the copiers at the beginning of the certain period of time and also distributes the current remaining number of copies among the copiers in accordance with the redistribution request flag, a redistribution unit for performing the redistribution may be provided.

In the above description, the distribution ratio calculated by the ratio calculation unit 91*c* is used for distributing the user quota at the beginning of the certain period of time and is reused for redistributing the current remaining number of copies. However, the ratio calculation unit 91*c* may recalculate the distribution ratio for the redistribution based on the use record of the user directly before the redistribution in the same period of time. This is to say, the ratio values used at the beginning of the certain period of time and at the redistribution may be different. Alternatively, the distribution ratio may be determined by the manager who is in charge.

(2-1-2c) Transmission Control Unit

The transmission control unit 93 includes a number transmission control unit 93*a* and a management data request transmission control unit 93*b*.

The number transmission control unit 93*a* transmits the numbers of copies distributed by the distribution unit 91*a* via the communication line to the management terminals 1*a*, 1*b*, . . . corresponding to the key code representing each specific user. When the redistribution is performed by the distribution unit 91*a* for the specific user, the number transmission control unit 93*a* transmits the respective reassignment to the management terminals 1*a*, 1*b*, . . . corresponding to the key code representing the specific user. Here, the reassignment may increase or decrease as compared with the original assignment, so that the number transmission control unit 93*a* first transmits to the management terminals 1*a*, 1*b*, . . . of copiers whose reassignment is lower than the original assignment. If the number transmission control unit 93*a* first transmits a reassignment which increases as compared with the original assignment to the corresponding management terminal, the sum of the assignments stored in the management terminals 1*a*, 1*b*, . . . may temporarily exceed the user quota. In addition, if the following transmissions are delayed due to a malfunction of the communication line network, copy operations may be performed in excess of the user quota allocated to the user. To avoid this problem, the number transmission control unit 93*a* determines the transmission order in which the reassignment that decreases as compared with the assignment currently stored in the corresponding management terminal is transmitted first.

More specifically, when the distribution unit 91*a* calculates the reassignments for the specific user, the number transmission control unit 93*a* stores the transmission data in a transmission table 1 shown in FIG. 4 in the order in which the reassignments that decrease as compared with the original assignments are listed first. In the transmission table 1, the management terminal ID of a management terminal as the transmission destination, the key code of the user whose user quota is being redistributed, and the number of copies redistributed to the corresponding copier are stored as one combination. The combinations are listed in the transmission order. Note that although only one key code is shown in FIG. 4, other key codes follow if the number of copies is being redistributed for other users. When detecting that the transmission request flag 1 is set, the number transmission control unit 93*a* transmits the first data combination stored in the transmission table 1 to the corresponding management terminal. The transmitted data combination is deleted from the transmission table 1. After transmitting all of the data, the number transmission control unit 93*a* resets the transmission request flag 1.

When the redistribution request reception unit 92*a* receives the redistribution request from one of the management terminals, the management data request transmission control unit 93*b* transmits a transmission request of the management data X to all of the management terminals 1*a*, 1*b*, . . . . More specifically, the management data request transmission control unit 93*b* generates a transmission table 2 as shown in FIG. 5. In the transmission table 2, all of the management terminal IDs of the management terminals which are to transmit the management data X are stored corresponding to the key code of the user for whom the redistribution request is issued. When the transmission request flag 2 is set, the management data request transmission control unit 93*b* requests the transmission of the management data X to each of the management terminals whose management terminal ID is listed on the transmission table 2. When doing so, the management data request transmission control unit 93*b* deletes transmitted data from the transmission table 2. On the completion of the transmission to all the management terminals listed on the transmission table 2, the management data request transmission control unit 93*b* resets the transmission request flag 2.

(2-2) Copiers and Management Terminals

The following is a description of the copiers 4*a*, 4*b*, . . . and the management terminals 1*a*, 1*b*, . . . that respectively manage the copiers 4*a*, 4*b*, . . . . .

(2-2-1) Hardware Constructions of Copier and Management Terminal

Figure 6:
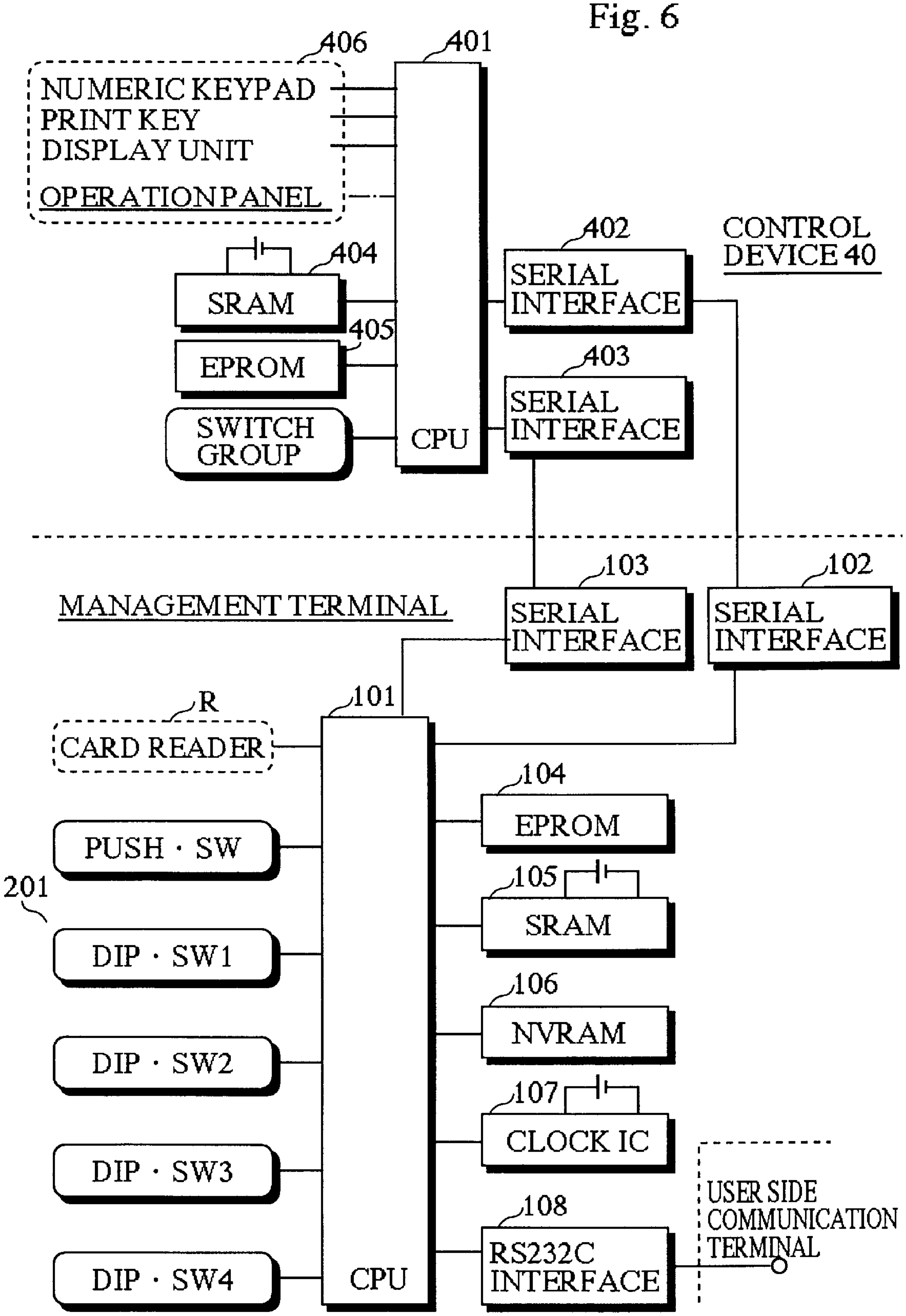
FIG. 6 shows a hardware construction of a copier and a management terminal.

FIG. 6 shows the hardware constructions of a control device and a management terminal provided for each of the copiers 4*a*, 4*b*, . . . . All control devices, management terminals, and copiers have the same constructions, and therefore, these are respectively referred to as a control device 40, a management terminal 1, and a copier 4 when the common construction is explained.

(2-2-1a) Control Device of Copier

Figure 7:
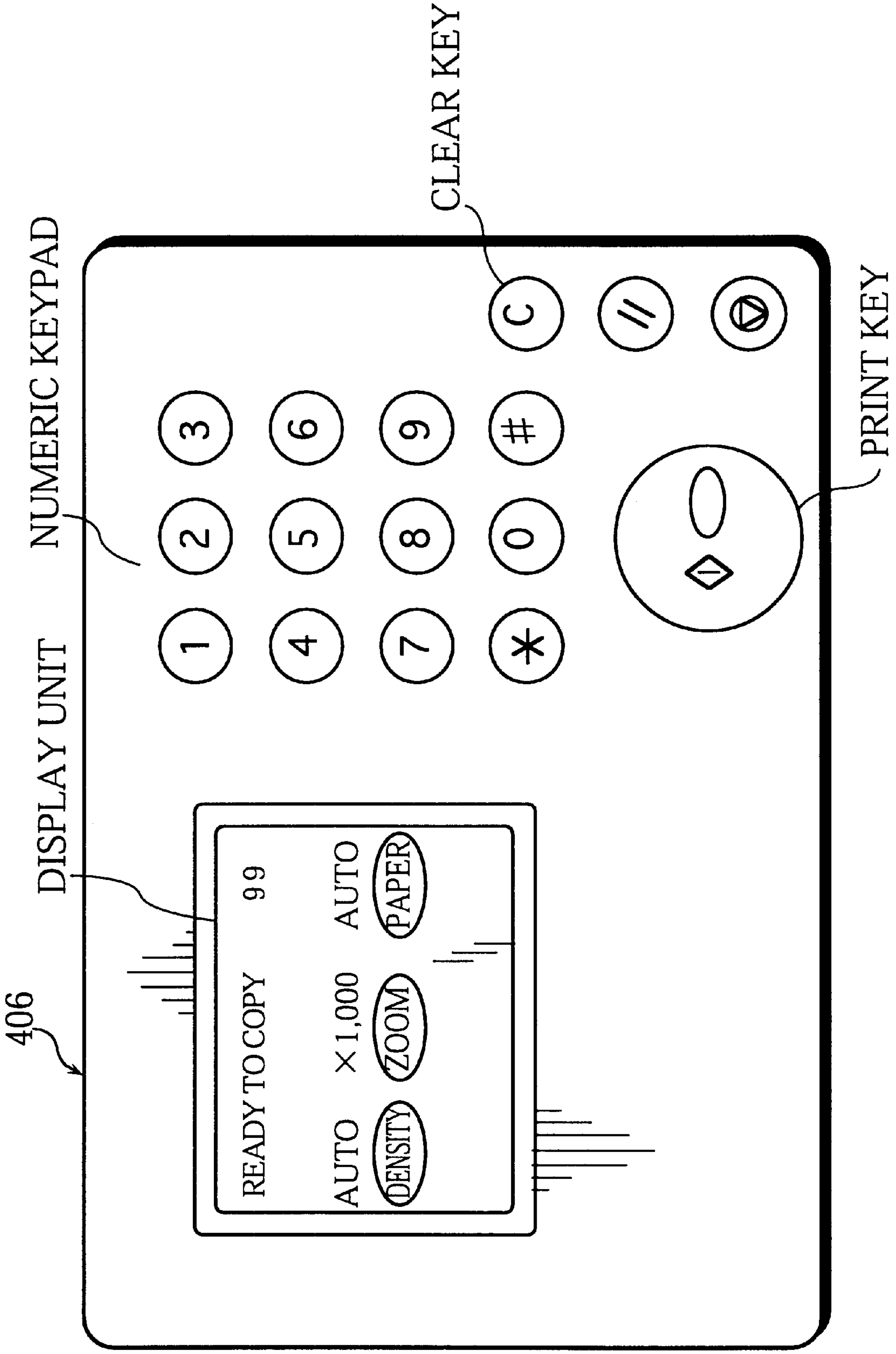
FIG. 7 shows an example of an operation panel of the copier.

The control device 40 of the copier 4 is composed of a CPU 401 performing various kinds of operations, an SRAM 404 serving as a work area, an EPROM 405 storing programs for various control operations, and serial interfaces 402 and 403 that are connected to the management terminal 1. The control device 40 is connected to a key switch group provided on an operation panel 406 and a switch group shown in FIG. 7. The key switch group includes a print key for starting a copy operation, a numeric keypad for inputting numeric values, and a clear key for clearing inputted settings. The switch group includes switches such as an error reset switch for resetting errors.

With this construction, in accordance with an instruction from the management terminal 1, the CPU 401 of the control device 40 allows or prohibits a copy operation to be performed by the copier 4 according to the programs stored in the EPROM 405. The CPU 401 transmits a copy signal indicating the completion of the copy operation to the management terminal 1 every time a copy operation is performed. The control device 40 performs the mode settings which are performed for a standard copier and has the copier 4 perform the copy operation in accordance with the settings. It should be noted here that the control device 40 has the state of the copier, the number of copies to be performed, and the like displayed on a display unit of the operation panel 406.

(2-2-1b) Management Terminal

The management terminal 1 is composed of a CPU 101 for performing various kinds of operations, an EPROM 104 storing programs for various control operations, an NVRAM 106 storing key codes respectively representing the users, an SRAM 105 serving as a work area, a clock IC (integrated circuit) 107, serial interfaces 102 and 103 connected to the copier 4, an RS232C interface 108 connected to the PBX, and a switch group 201 for the user to externally change the settings. The management terminal 1 is connected to a card reader R for reading a user card which is given to each user.

Figure 8:
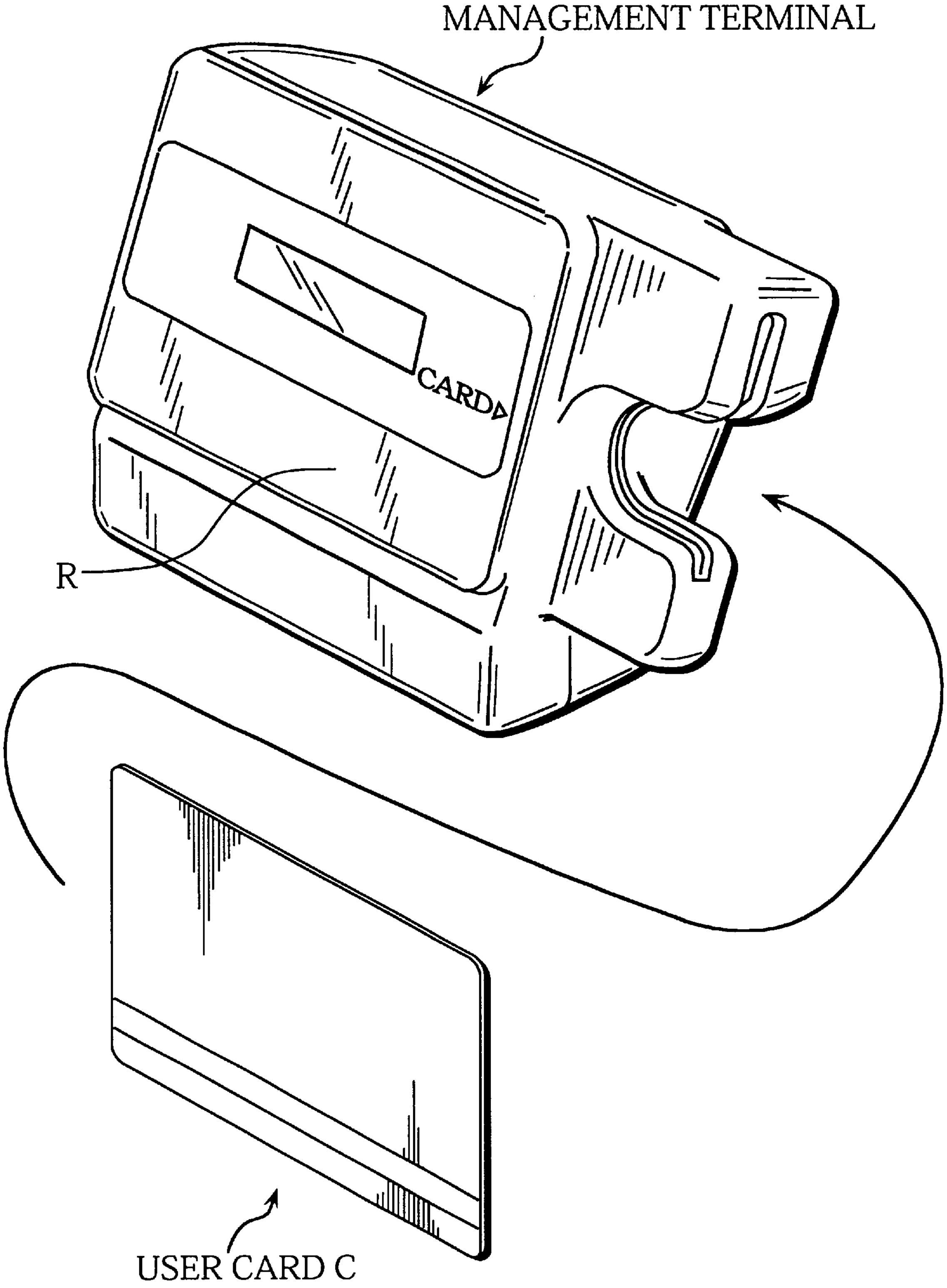
FIG. 8 is a perspective view of the management terminal provided with a card reader.

FIG. 8 shows a perspective view of the card reader R provided in the management terminal 1. The key code representing the user as identification information is magnetically recorded onto or punched into the user card C. Here, although the user is identified by the user card C, the user may be identified by other methods. As one example, the user may input a personal identification number using the numeric keypad.

With this construction, the management terminal 1 identifies the user who uses the copier 4 connected to the management terminal 1 by the user card C and manages the copy operations performed by the copier 4, with the number of copies performed by the copier 4 being limited to the assignment allocated to the user. The management terminal 1 generates the management data X in which the number of copies performed by the copier 4 is recorded for each user, and transmits the management data X to the host computer 90 when a transmission request is issued from the host computer 90. In addition to being used by the host computer 90 to accumulate the number of copies that the user has made using the copiers in the host computer 90, the management data X is also used as the basis to prepare invoices at the service center and as a guide for maintenance. When the user has made the assignment using the copier 4, the management terminal 1 transmits a request for the redistribution of the number of copies to the host computer 90.

(2-2-2) Functional Components

Figure 9:
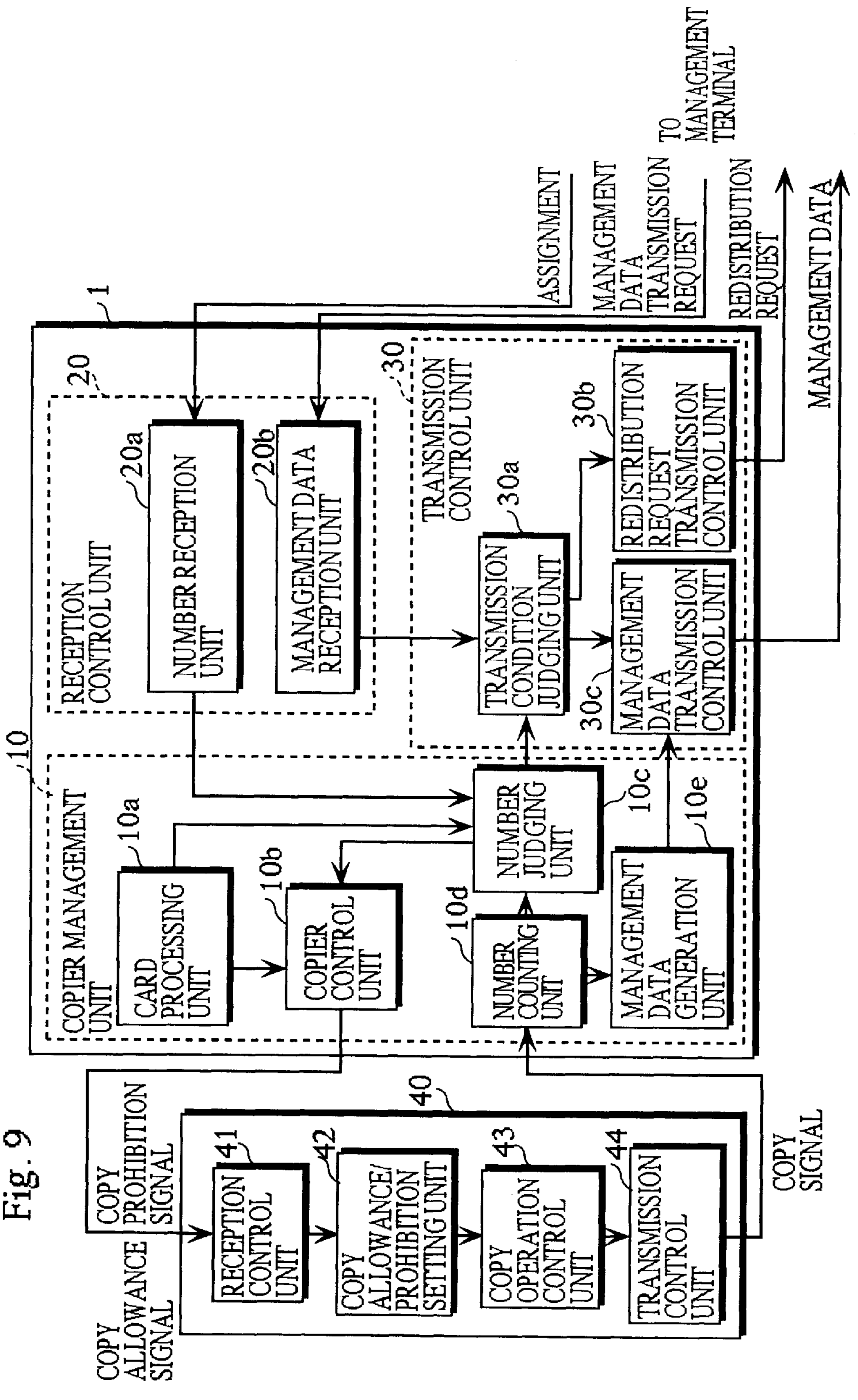
FIG. 9 is a block diagram showing functional constructions of the copier and the management terminal.

FIG. 9 is a functional block diagram showing the constructions of the control device 40 of the copier 4 and the management terminal 1 connected to the copier 4. FIG. 9 shows processing flows in the control device 40 of the copier 4 and the management terminal 1 for each functional component.

(2-2-2a) Copier

When divided into functional components, the control device 40 of the copier 4 is composed of: a reception control unit 41 for receiving a signal from the management terminal 1; a copy allowance/prohibition setting unit 42 for setting allowance/prohibition of a copy operation in accordance with the signal received by the reception unit 41; a copy operation control unit 43 for controlling the copy operation in accordance with the setting by the copy allowance/prohibition setting unit 42; and a transmission control unit 44 for controlling the transmission of a predetermined signal to the management terminal 1.

The reception control unit 41 receives a copy allowance signal and a copy prohibition signal transmitted from the management terminal 1.

The copy allowance/prohibition setting unit 42 sets the copier 4 to a copy allowed state when the copy allowance signal is transmitted from the management terminal 1, and sets the copier 4 to a copy prohibited state when the copy prohibition signal is transmitted from the management terminal When a copy allowance flag is set, the copy operation control unit 43 has a copy operation performed in accordance with an instruction from the operation panel 406, and neglects the instruction from the operation panel 406 when a copy prohibition flag is set. It should be noted here that the details of an actual copy operation are well known and do not relate to the gist of the present invention. Accordingly, copy operations will not be explained in the present embodiment.

The transmission control unit 44 judges whether a copy operation has been performed, and transmits a copy signal to the management terminal 1 every time the copy operation is performed.

(2-2-2b) Management Terminal

When divided into functional components, the management terminal 1 is composed of: a copier management unit 10 for counting the number of copies that have been performed by the copier 4 and for allowing/prohibiting copy operations by the copier 4; a reception control unit 20 for controlling data reception from the host computer 90; and a transmission control unit 30 for controlling data transmission to the host computer 90.

(2-2-2b1) Copier Management Unit

The copier management unit 10 includes a card processing unit 10*a*, a copier control unit 10*b*, a number judging unit 10*c*, a number counting unit 10*d*, and a management data generation unit 10*e*.

The card processing unit 10*a* determines, from a read signal outputted by the card reader R which reads the user card C, whether the copier 4 is allowed to perform the copy operation. More specifically, the card processing unit 10*a* detects a signal outputted from the card reader R, with the signal indicating that the user card C is inserted into a predetermined position, and then has the card reader R read the key code of the user card C. The card processing unit 10*a* compares the read key code with key codes previously stored in a registration table T set in the number counting unit 10*d* (described later) to determine if there is a match. If there is, the key code is set in a "card number value" which is set as a variable. If there is not, "0" is set in the "card number value".

In this way, the key code is set in the "card number value". The card processing unit 10*a* sets a copy allowance transmission flag when the number judging unit 10*c* judges that the copy operation is allowed, and resets the copy prohibition flag when the copy prohibition flag is set. The copy allowance transmission flag is used for judging whether the copy allowance signal needs to be transmitted to the copier 4. Meanwhile, the copy prohibition flag is used for judging whether the copy operation cannot be performed, such as when the user card C is not inserted into the card reader R. Moreover, the card processing unit 10*a* receives a signal indicating whether the user card C is currently inserted into the card reader R. If the user card C is not currently inserted, the card processing unit 10*a* sets the copy prohibition flag if it is not already set, and sets the copy operation prohibition transmission flag if the copier 4 is presently in the copy allowed state. The copy prohibition transmission flag is used for judging whether the copy prohibition signal needs to be transmitted to the copier 4.

The copier control unit 10*b* transmits the copy allowance signal to the copier 4 to allow copy operations and transmits the copy prohibition signal to the copier 4 to prohibit copy operations. More specifically, when the copy allowance transmission flag is set, the copier control unit 10*b* transmits the copy allowance signal and then resets the copy allowance transmission flag. When the copy prohibition transmission flag is set, the copier control unit 10*b* transmits the copy prohibition signal and then resets the copy prohibition transmission flag.

The number counting unit 10*d* counts the copy signals transmitted from the copier 4 within the certain period of time for each key code of the user cards C detected by the card reader R. The value obtained by counting the copy signals is equivalent to the number of copies that have been made by a user represented by a key code since the beginning of the month. More specifically, the number counting unit 10*d* stores the registration table T in which a number of copies is recorded for each key code of the users who use the copier 4, and increments the number of copies corresponding to the key code set in the "card number value" by the card processing unit 10*a* every time a copy signal is received. It should be noted here that the key codes are registered in the registration table T beforehand by the manager.

The number judging unit 10*c* compares the assignment with the number of copies having been made by the user who has inserted the user card C. When the number of copies having been made reaches the assignment, the number judging unit 10*c* prohibits the copy operation to be performed and executes processing to request the redistribution of the number of copies to the host computer 90 for the present user. More specifically, the number judging unit 10*c* stores the assignment transmitted from the host computer 90 for each key code and compares the assignment with the number of copies currently recorded in the registration table T of the number counting unit 10*d*. When the number of copies having been made by the user reaches the assignment, the number judging unit 10*c* sets the redistribution request flag. Here, when the copy operation is currently being allowed according to the present settings, the number judging unit 10*c* sets the copy prohibition flag and the copy prohibition transmission flag. The redistribution request flag is used for judging whether the redistribution request needs to be transmitted.

The management data generation unit 10*e* generates the management data X including the number of copies that have been made within the certain period of time for each key code, in accordance with the counting result by the number counting unit 10*d*. Note that while only the number of copies for each user is described as the management data X, the management data X is not limited to this. For example, the number of copies for each size of the record sheet may be included in the management data X. Also, the number of copies in color copy mode and that in black-and-white copy mode may be separately included in the management data X. Alternatively, data indicating the copier type may be included , and the number of supplied sheets for each sheet supply cassette and the number of times the display unit has been used may be included in the management data X for maintenance.

(2-2-2c) Reception Control Unit

The reception control unit 20 includes a number reception unit 20*a* for receiving the assignment transmitted from the host computer 90 and a management data request reception unit 20*b* for receiving the management data transmission request transmitted from the host computer 90.

The number reception unit 20*a* receives the assignment corresponding to a specific key code from the host computer 90 and transmits the received assignment to the number judging unit 10*c* when the copy prohibition flag is set.

The management data request reception unit 20*b* receives the management data transmission request from the host computer 90 and sets a management data transmission flag when the copy prohibition flag is set. The management data transmission flag is used for judging whether the management data X needs to be transmitted.

When the copy prohibition flag is not set, this means that a copy operation is being currently performed and that the recorded content of the registration table T of the number counting unit 10*d* is being currently rewritten. Therefore, the reception control unit 20 does not receive the assignment and the management data transmission request.

(2-2-2d) Transmission Control Unit

The transmission control unit 30 is composed of a transmission judging unit 30*a* for judging which data is to be transmitted to the host computer 90, a management data request transmission control unit 30*c* for transmitting the management data X to the host computer 90 via the communication line, and a redistribution request transmission control unit 30*b* for transmitting the request for the redistribution of the number of copies for the specific user to the host computer 90 via the communication line.

The transmission condition judging unit 30*a* performs processing for setting a value of a state counter indicating a transmission condition. The transmission condition is represented by "0", "1", and "2". When only the management data X is to be transmitted, the transmission condition is set at "1" When the management data X and the redistribution request are to be transmitted, the transmission condition is set at "2". In other cases, the transmission condition is set More specifically, the transmission condition is set at "1" when the management data transmission flag is set and when the certain period of time has elapsed. Note that this certain period of time is set so that the management data X is regularly transmitted to the host computer 90. When the certain period of time has elapsed, the time is reset for another certain period of time. When the management data transmission flag is set, the transmission condition is set at "1". Simultaneously, the management data transmission flag is reset.

When the transmission condition is not set at "1" and the redistribution request flag is set, the transmission condition is set at "2". Simultaneously, the redistribution request flag is reset.

When the transmission condition is set at "1" or "2", the management data request transmission control unit 30*c* controls the management data X generated by the management data generation unit 10*e* to be transmitted together with the corresponding key code and the corresponding management terminal ID to the host computer 90.

When the transmission condition is set at "2", the redistribution request transmission control unit 30*b* controls the redistribution request to be transmitted to the host computer 90 corresponding to the key code which is set in the "card number value" of the card processing unit 10*a*.

(3) System Operation

The following is a description of the operation performed by the network system which has the stated construction.

(3-1) Overall Operation

Figure 10:
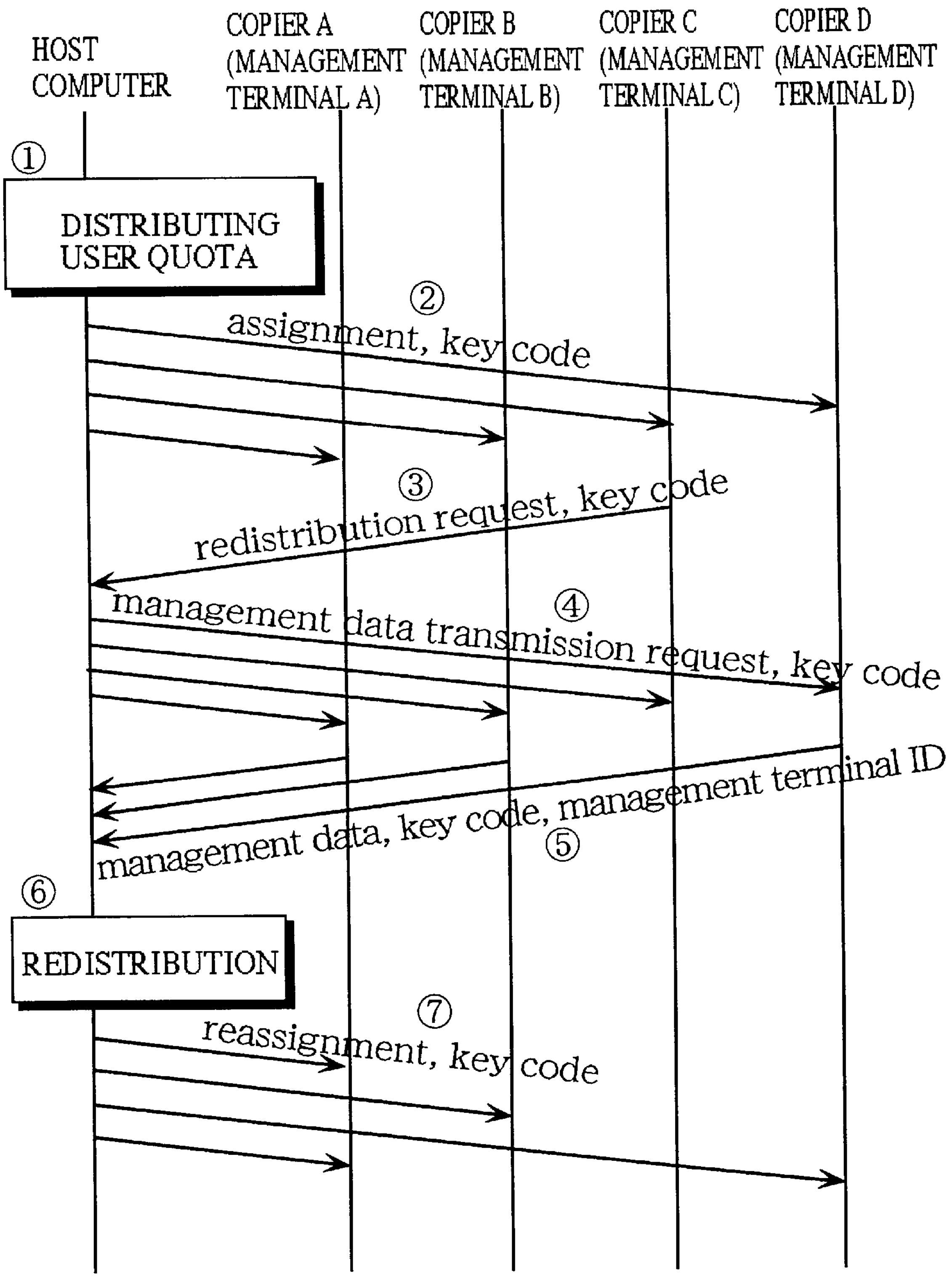
FIG. 10 is a sequence diagram representing the operation performed by a system of the present embodiment.

FIG. 10 is the sequence diagram showing the operation performed by the present system. It should be noted here that each copier and corresponding management terminal are illustrated as one set and that the management data X regularly transmitted from the management terminals 1*a*, 1*b*, . . . to the host computer 90 is not illustrated. Also note that the copiers used here are limited to the copiers A, B, C, and D for the sake of convenience. Suppose that user H is allocated 1,000 copies as the user quota at the beginning of the month. In practice, a user quota is respectively allocated to the plurality of users, but since the processing to manage the number of copies for each user is performed independently, the management of the number of copies is explained only for user H in the present embodiment.

When the assignments are calculated for user H (⓪), the host computer 90 transmits the respective assignment to each of the copiers A, B, C, and D together with the key code of user H (②). On receiving the assignment, each of the copiers A, B, C, and D stores the assignment in the number judging unit 10*c* corresponding to the received key code.

Suppose that user H has made: 137 copies using the copier A; 63 copies using the copier B; 100 copies using the copier C; and 0 copy using the copier D. As such, user H can still make copies, with the current remaining number of copies for each copier being obtained by subtracting the number of copies having already made from the assignment. That is, the user can still make: 400 copies using the copier A; 200 copies using the copier B; 0 copy using the copier C; and 100 copy using the copier D.

Here, since the user cannot make a copy using the copier C, the management terminal of the copier C transmits the redistribution request together with the key code of user H to the host computer 90 (③).

On receiving this redistribution request from the management terminal of the copier C, the host computer 90 transmits the transmission request of the management data X and the key code of user H to the copiers A, B, C, and D to know the number of copies that have been made by user H since the beginning of the month (④).

On receiving the transmission request, each of the copiers A, B, C, and D transmits the management data X recording the number of copies having been made by user H since the beginning of the month together with the key code of user H and its management terminal ID (⑤).

In accordance with this data respectively transmitted from the copiers A, B, C, and D, the host computer 90 calculates the current remaining number of copies. More specifically, the host computer 90 subtracts the total number of copies that have been made from the user quota. The calculation result is 700. The current remaining number of copies is redistributed by the distribution unit 91*a* for user H, so that the reassignment is obtained for each copier (⑥). Here, the distribution ratio is the same as that described earlier in this specification, i.e., the distribution ratio (1). As a result, the reassignment are calculated as 513 copies for the copier A, 247 copies for the copier B, 170 copies for the copier C, and 70 copies for the copier D.

After the processing for the redistribution, the host computer 90 transmits the reassignment together with the key code to each of the copiers A, B, C, and D (⑦). When doing so, the host computer 90 places high priority on the copier for which the reassignment decreases as compared with the original assignment. In the present case, the assignment changes from 537 to 513 for the copier A, from 263 to 247 for the copier B, from 100 to 70 for the copier C, and from 100 to 170 for the copier D. Therefore, the host computer 90 transmits the reassignment to the copiers D, A, and B first in this order, and then transmits to the copier C. Accordingly, user H can further make 70 copies using the copier C, which is obtained by subtracting the number of copies that have been made from the reassignment.

Hereinafter, when user H makes the reassignment using one of the copiers A, B, C, and D, the current remaining number of copies is redistributed in accordance with the redistribution request transmitted from the corresponding copier. Accordingly, as long as the number of copies made by user H does not exceed the user quota, user H can always make a copy using any of the copiers A, B, C, and D. This solves the problem where a copier with high past use record cannot be used when the assignment has been used up even though a copier with low past use record may still be used. Consequently, the user quota can be used according to the user's wishes.

The current remaining number of copies is always redistributed in accordance with the past use record. Also, when copy operations are not performed in keeping with the past use record, such as when a great number of copies are performed by a copier which has a low use record, and the assignment is used up, the copier can soon return to the copy allowed state as long as the user has not used up his/her entire user quota. On the other hand, there is no way in which the user will be able to make a number of copies that exceeds his/her user quota within the certain period of time.

Moreover, the number of copies is distributed by the distribution ratio based on the past use record, so that the user can make copies using the copiers which are respectively distributed the appropriate number of copies.

(3-2) Operations of Components

The operations performed by the stated components are next described.

(3-2-1) Host Computer

Figure 11A:
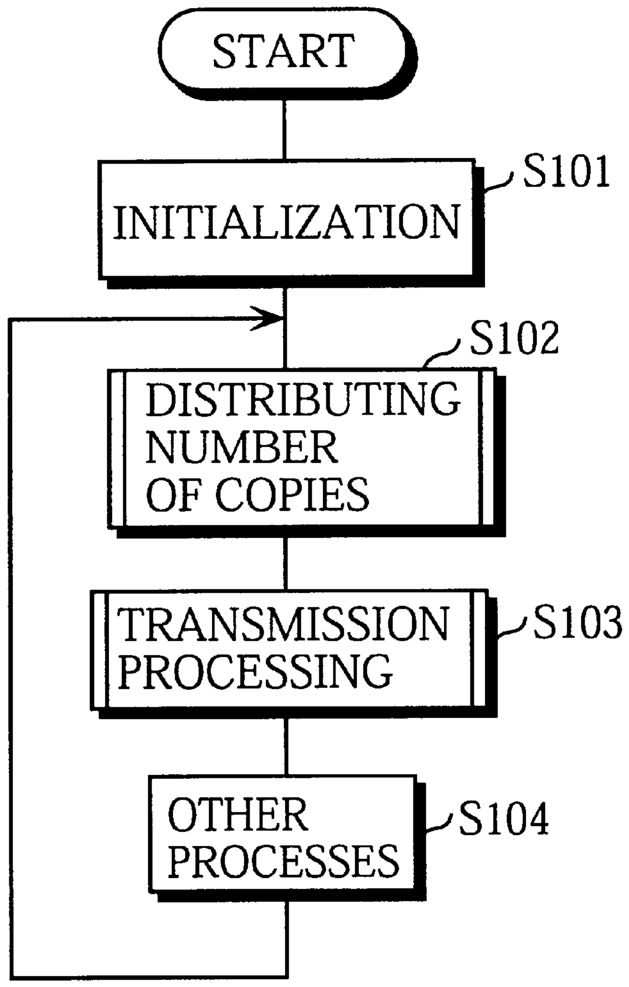
FIG. 11A is a flowchart showing the main processing performed by the host computer.
Figure 11B:
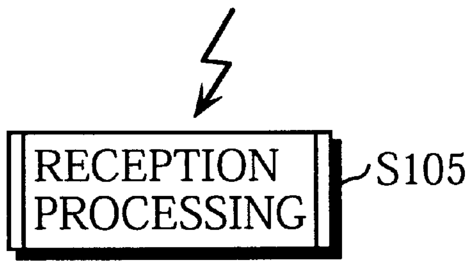
FIG. 11B shows the reception processing as an interrupt processing performed by the host computer.

The operation performed by the host computer 90 is first explained. FIGS. 11A and 11B are the flowcharts showing the processing performed by the CPU 901 of the host computer 90. FIG. 11A shows the main routine of the processing, while FIG. 11B shows the reception processing which takes priority over the main routine. The CPU 901 temporarily suspends the main routine to perform this reception processing as an interrupt processing. The reception processing is performed by the reception control unit 92.

(3-2-1a) Main Routine of Processing

As shown in the main routine of FIG. 11A, the initialization is first performed (step S101). Then, the following processing is repeated. The number of copies distribution processing is performed by the number management unit 91 (step S102), and the transmission processing is then performed by the transmission control unit 93 (step S103). After this, other processes which do not directly relate to the present invention are performed (step S104). Detailed explanations of these steps and the reception processing are given below.

(3-2-1b) Reception Processing

Figure 12:
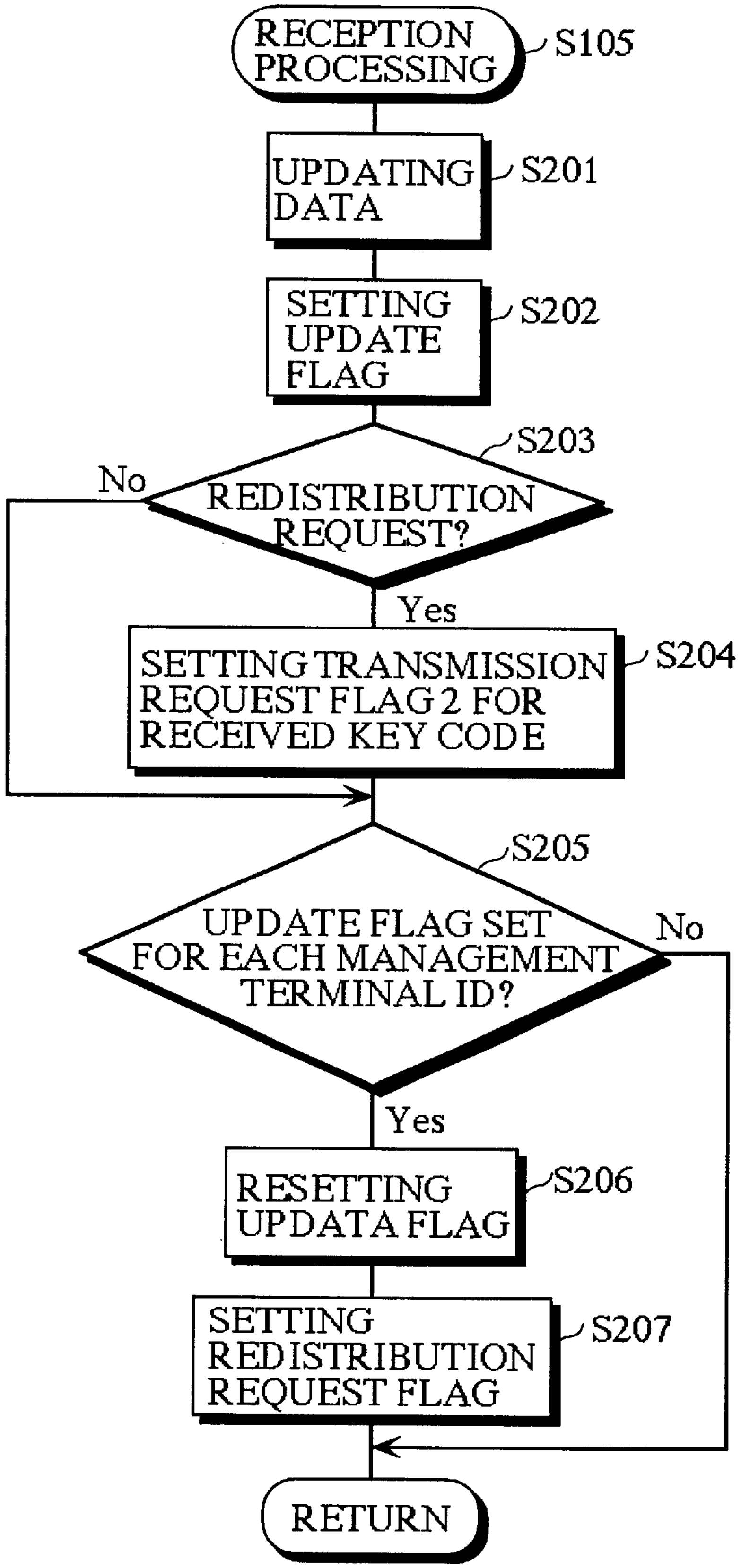
FIG. 12 is a flowchart showing the reception processing performed by the host computer.

The reception processing is explained with reference to FIG. 12 which shows the detailed flowchart. The reception processing takes priority over any other processing and is activated when the host computer 90 receives the data from one of the management terminals 1*a*, 1*b*, . . . . As described above, the management terminals 1*a*, 1*b* . . . transmit the request for the redistribution of the number of copies and the management data X recording the number of copies performed by the copiers 4*a*, 4*b*, . . . to the host computer 90. When transmitting the redistribution request, the management terminals 1*a*, 1*b*, . . . also transmit the management data X.

When the management data X is transmitted together with the key code of a specific user from one of the management terminals 1*a*, 1*b*, . . . , the management data reception unit 92*b* receives this data and sets the update flag for this management data X corresponding to the key code (steps S201 and S202).

Next, if redistribution is requested for the specific user ("Yes" in step S203), the redistribution request reception unit 92*a* sets the transmission request flag 2 for the key code of the specific user (step S204). If the redistribution is not requested ("No" in step S203), the redistribution request reception unit 92*a* takes no action. When the transmission request flag 2 is set, the transmission table 2 (shown in FIG. 5) is generated, in which the transmitted key code and all of the management terminal IDs of the management terminals that transmit the management data X are stored.

The management data reception unit 92*b* judges whether the update flag associated with the key code of the specific user is set for each of the management terminal IDs, that is, the management data reception unit 92*b* judges whether the management data X associated with the specific user is transmitted from each of the management terminals 1*a*, 1*b*, (step S205). If not, that is, if the update flag is not set for each of the management terminal IDs, the reception processing is terminated. Since the management data X is transmitted when the certain period of time has elapsed and when the host computer 90 transmits the transmission request to the management terminals 1*a*, 1*b*, . . . , the management data X is sequentially transmitted from the management terminals 1*a*, 1*b*, . . . . This is to say, the reception processing is repeatedly activated. In the end, each management data X of all of the copiers used by the specific user is transmitted to the host computer 90, and the update flag is set for each of the management terminal IDs. Then, the management data reception unit 92*b* resets the update flags (step S206) and sets the redistribution request flag to request the redistribution to the distribution unit 91*a* (step S207).

(3-2-1c) Number of Copies Distribution Processing

Figure 13:
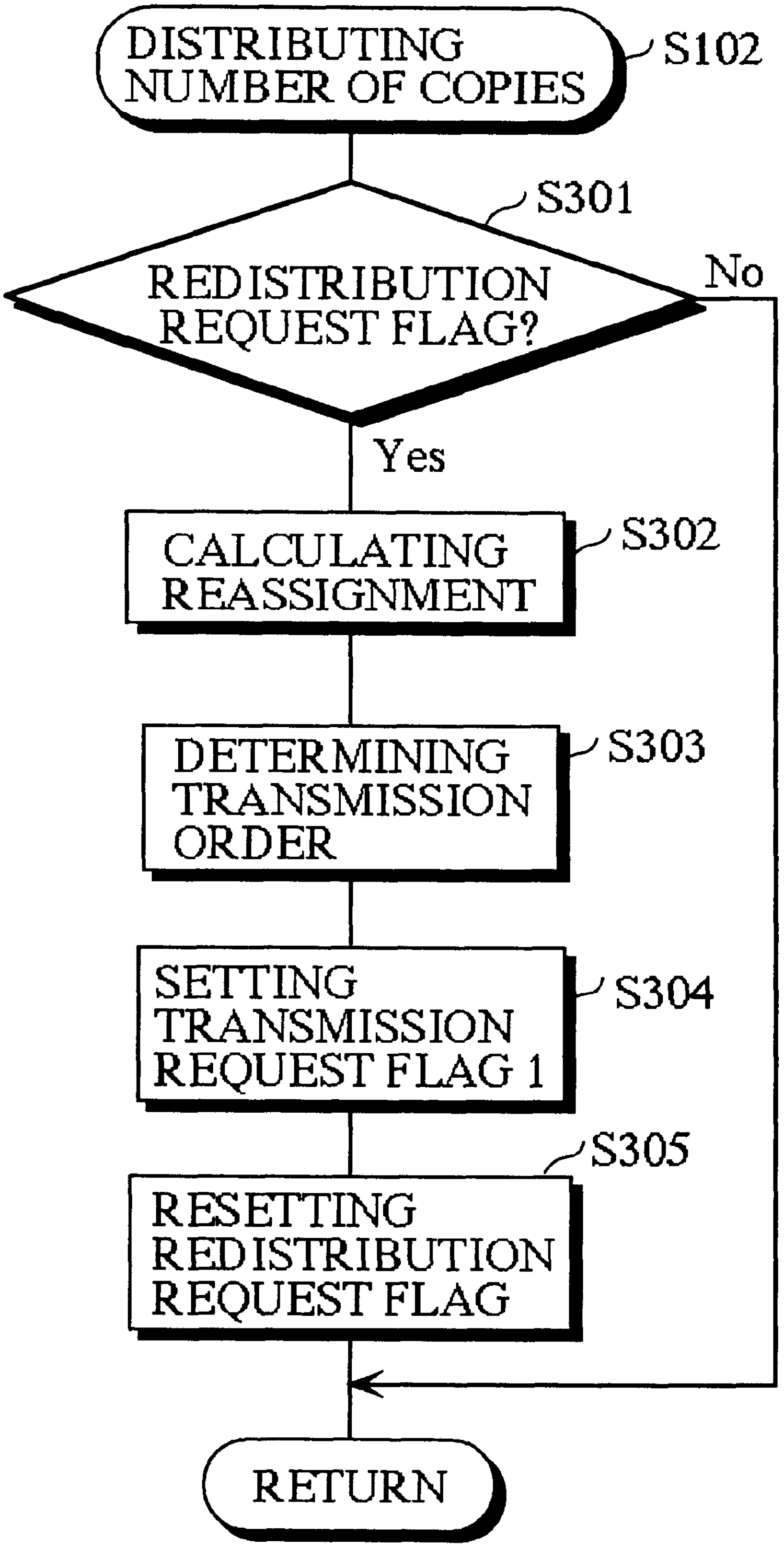
FIG. 13 is a flowchart showing the number of copies distribution processing performed by the host computer.

Next, the number of copies distribution processing of the main routine shown in FIG. 11A is explained. FIG. 13 is the detailed flowchart showing the number of copies distribution processing. The distribution unit 91*a* judges whether the redistribution request flag is set in the reception processing (step S301). If not, the processing is terminated. If it is set, the distribution unit 91*a* calculates the number of copies for each of the management terminals 1*a*, 1*b*, . . . . More specifically, the distribution unit 91*a* distributes the current remaining number of copies recorded in the number storage unit 91*b* for each key code in accordance with the distribution ratio calculated by the ratio calculation unit 91*c*. By setting the redistribution flag, the same calculation based on the distribution ratio is performed at the beginning of the month when the user quota is inputted.

After the calculation, the transmission order of the reassignment to the management terminals 1*a*, 1*b*, . . . is determined, in which the reassignment that decreases as compared with the assignment currently stored in the corresponding management terminal is transmitted first. The determined order is recorded in the transmission table 1 (shown in FIG. 4) of the number transmission control unit 93*a*.

After determining the transmission order, the distribution unit 91*a* sets the transmission request flag 1 (step S304). Then, the distribution unit 91*a* resets the redistribution request flag (step S305) and terminates the number of copies distribution processing.

(3-2-1d) Transmission Processing

Figure 14:
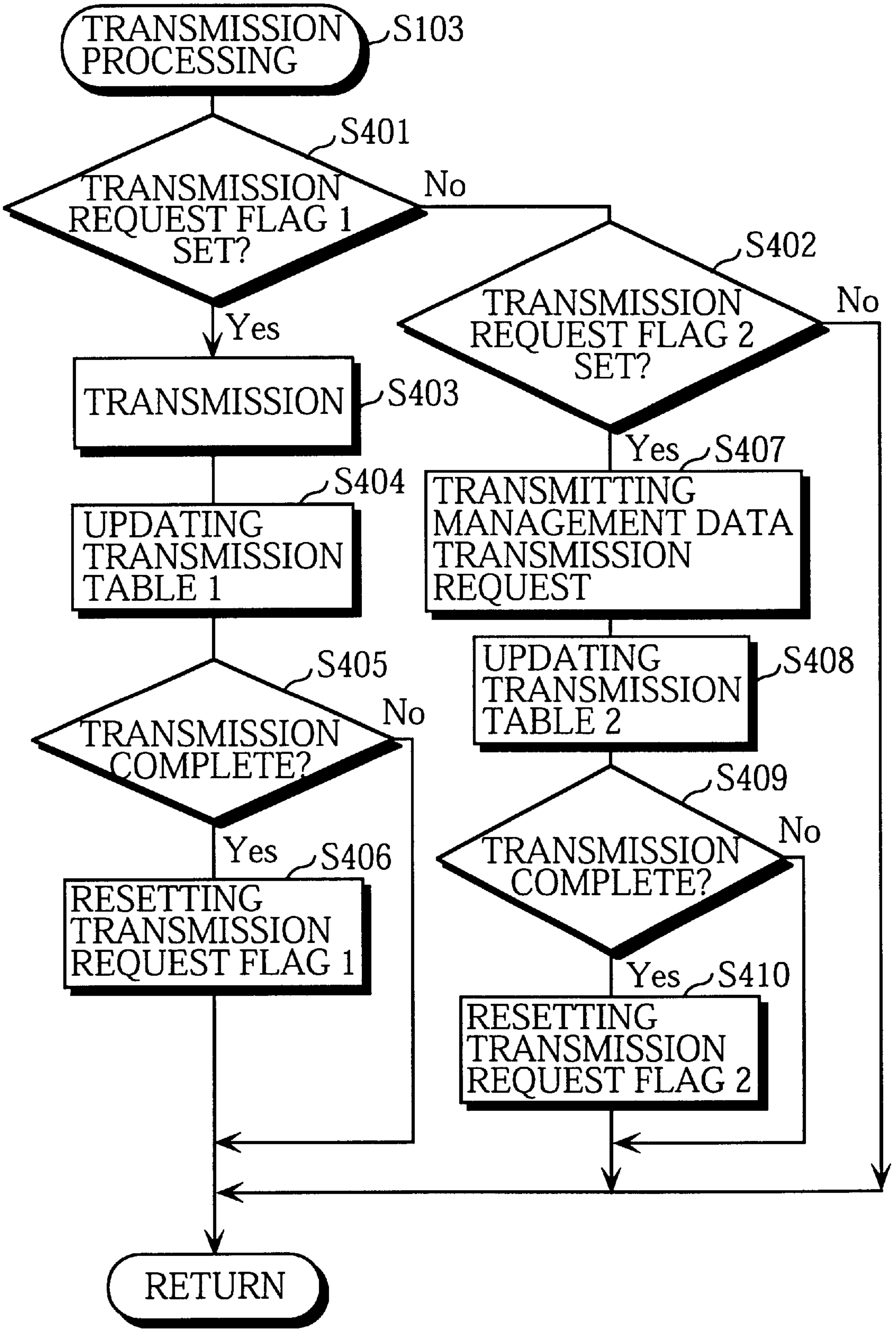
FIG. 14 is a flowchart showing the transmission processing performed by the host computer.

The following is an explanation of the transmission processing of the main routine shown in FIG. 11A. The detailed flowchart of the operation of the transmission processing is shown in FIG. 14. The transmission control unit 93 judges whether the transmission request flag 1 is set (step S401). If not, the transmission control unit 93 next judges whether the transmission request flag 2 is set (step S402). If not, the transmission processing is terminated.

When the transmission request flag 1 is set, this means that the assignment needs to be transmitted. As such, the number transmission control unit 93*a* transmits a combination of data which is first listed on the transmission table 1 (step S403). After being transmitted, the combination of data is deleted from the transmission table 1 (step S404). The transmission control unit 93 judges whether all of the data listed on the transmission table 1 has been transmitted, in other words, whether data is remained in the transmission table 1 (step S405). If the transmission is complete, the transmission control unit 93 resets the transmission request flag 1 (step S406) and terminates the transmission processing. If data is remained in the transmission table 1, the transmission control unit 93 terminates the transmission processing without resetting the transmission request flag 1. Since the combination of data is transmitted one at a time, the data remained in the transmission table 1 is to be transmitted in a next cycle of the main routine. Alternatively, all the combinations of data in the transmission table 1 may be transmitted in S403.

When the transmission request flag 2 is set, this means that the request for the transmission of the management data X needs to be transmitted. As such, the management data request transmission control unit 93*b* transmits the request for the transmission of the management data X associated with the recorded key code of the user to the management terminals whose management terminal IDs are recorded in the transmission table 2 (step S407). After the transmission, the data is deleted from the transmission table 2 (step S408). Next, the transmission control unit 93 judges whether the management data transmission request is transmitted to all of the management terminals 1*a*, 1*b*, . . . , in other words, whether data is remained in the transmission table 2 (step S409). If the transmission of the request is not performed, the transmission control unit 93 resets the transmission request flag 2 (step S410), and terminates the transmission processing. If data is remained in the transmission table 2, the transmission control unit 93 terminates the transmission processing without resetting the transmission request flag 2. It should be noted here that the data remained in the transmission table 2 is to be transmitted in a next cycle of the main routine.

(3-2-2) Operation of Copier

Figure 15A:
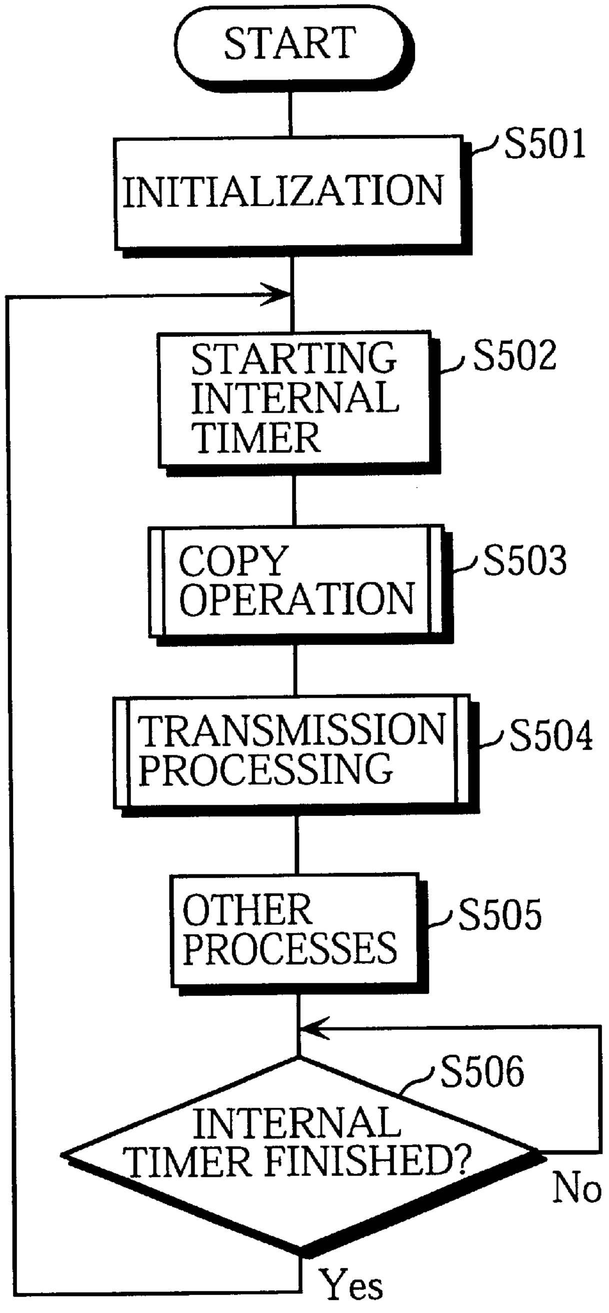
FIG. 15A is a flowchart showing the main processing performed by the copier.
Figure 15B:
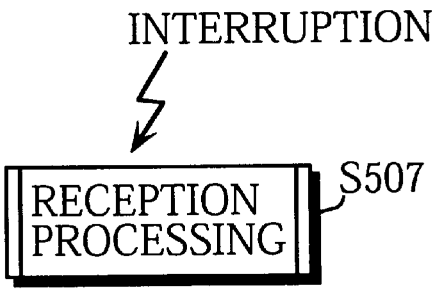
FIG. 15B is a flowchart showing the reception processing as an interrupt processing performed by the copier.

The following is a description of the operation performed by the control device 40 of the copier 40. FIGS. 15A and 15B are the flowcharts showing the processing 25 performed the CPU 401 of the control device 40 of the copier 4. FIG. 15A shows the main routine, while FIG. 15B shows the reception processing which takes priority over the main routine. The CPU 401 temporarily suspends the main routine to perform this reception processing as an interrupt processing.

After initialization of the CPU 401 (step S501), the CPU 401 starts timing using an internal timer (step S502).

Then, a copy operation and a transmission processing are performed (steps S503 and S504), and other processed are performed (step S505). After this, the CPU 401 waits for the internal timer to finish (step S506) and returns to step S502 to repeat the processing described above. Detailed explanations of these steps and the reception processing are given below.

Figure 16:
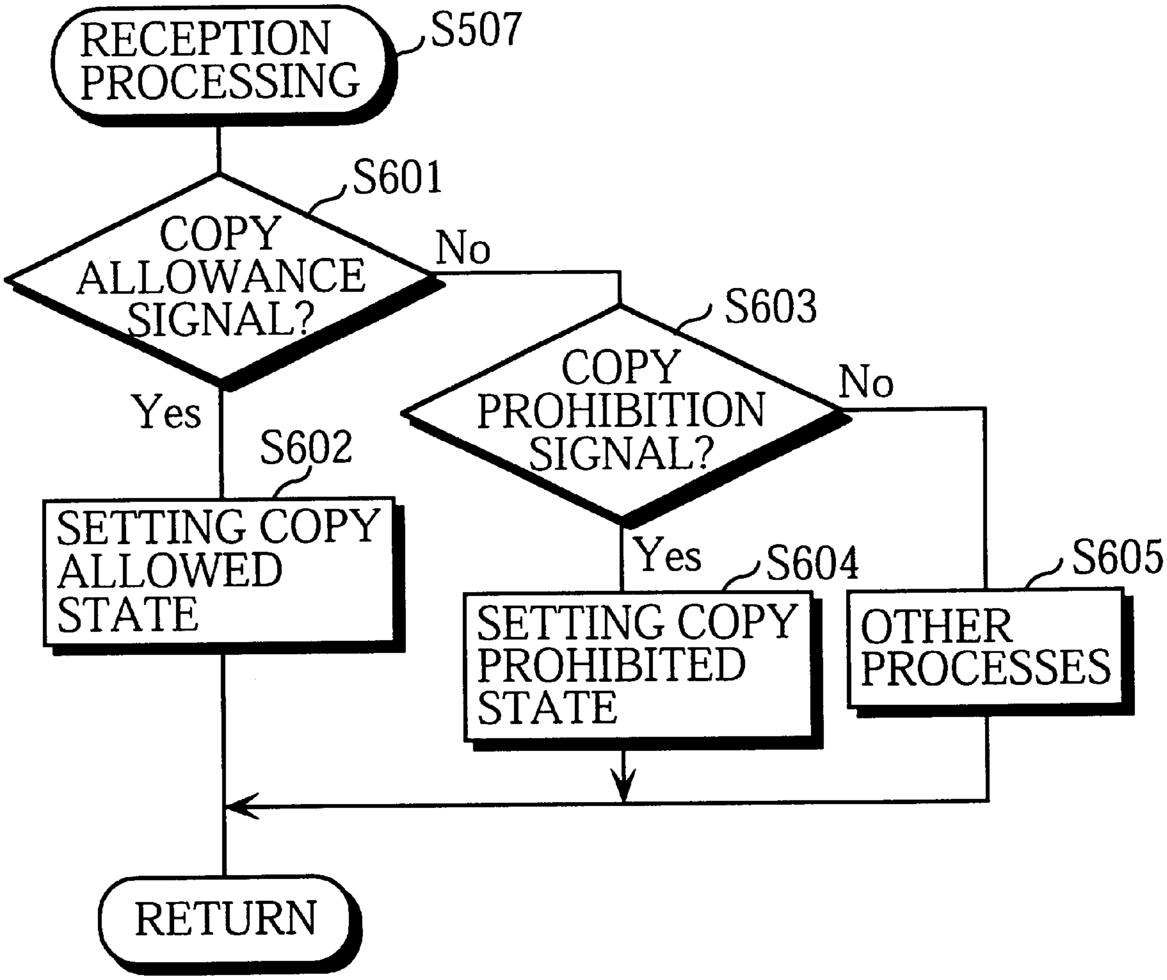
FIG. 16 is a flowchart showing the reception processing performed by the copier.

The reception processing is explained, with reference to FIG. 16 which shows the detailed flowchart. The reception control unit 41 of the copier 4 receives the copy allowance signal and the copy prohibition signal transmitted from the management terminal 1. The copy allowance/prohibition setting unit 42 judges whether the copy allowance signal is received (step S601). If so, the CPU 401 sets the copier 4 in the copy allowed state (step S602). If not, the copy allowance/prohibition setting unit 42 judges whether the copy prohibition signal is received (step S603). If it is received, the CPU 401 sets the copier 4 in the copy prohibited state (step S604). If the prohibition signal is not received, the CPU 401 performs other processes (step S605) and terminates the reception processing.

Figure 17:
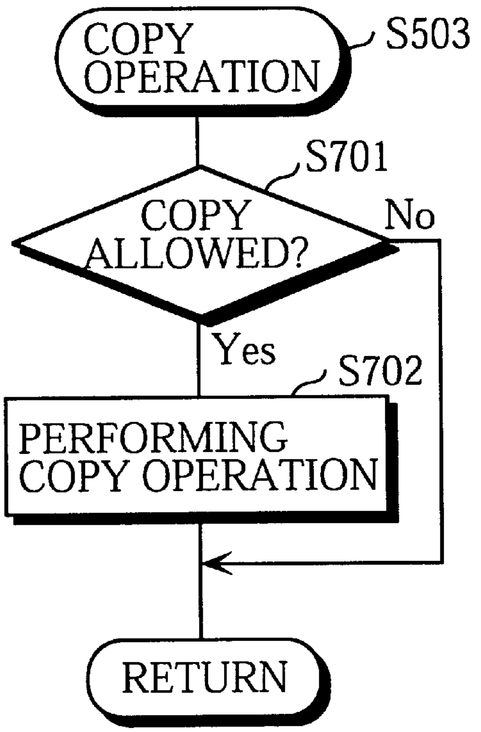
FIG. 17 is a flowchart showing the copy operation performed by the copier.

Next, the processing for the copy operation in the main routine (shown in FIG. 15A) is explained, with reference to the detailed flowchart of FIG. 17. The CPU 401 judges whether the copier 4 is in the copy allowed state (step S701). If so, the copy operation control unit 43 has the copy operation performed in accordance with the instruction from the operation panel 406 (step S702). If the copier is not in the copy allowed state in S701, the copy operation control unit 43 terminates the processing without having the copy operation performed.

Figure 18:
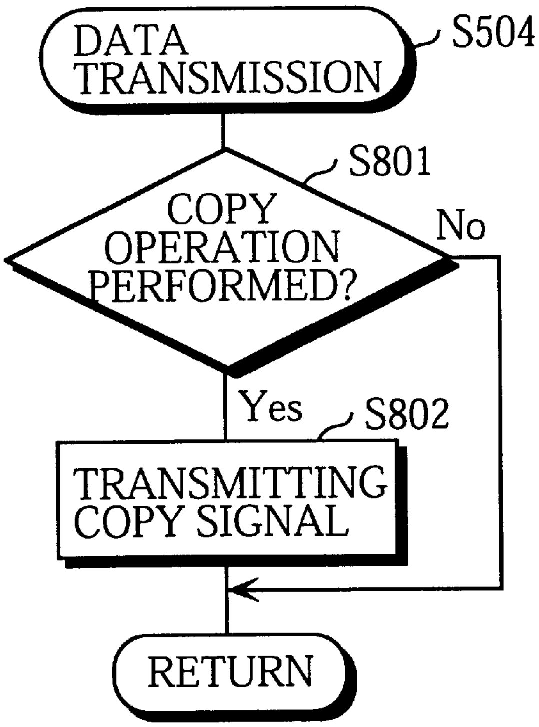
FIG. 18 is a flowchart showing the transmission processing performed by the copier.

A transmission processing in the main routine is next explained, with reference to the detailed flowchart of FIG. 18. The transmission control unit 44 judges a copy operation has been performed (step S801). If so, the transmission control unit 44 transmits the copy signal to the management terminal 1 (step S802), and, if not, terminates the transmission processing.

(3-2-3) Management Terminal

Figure 19A:
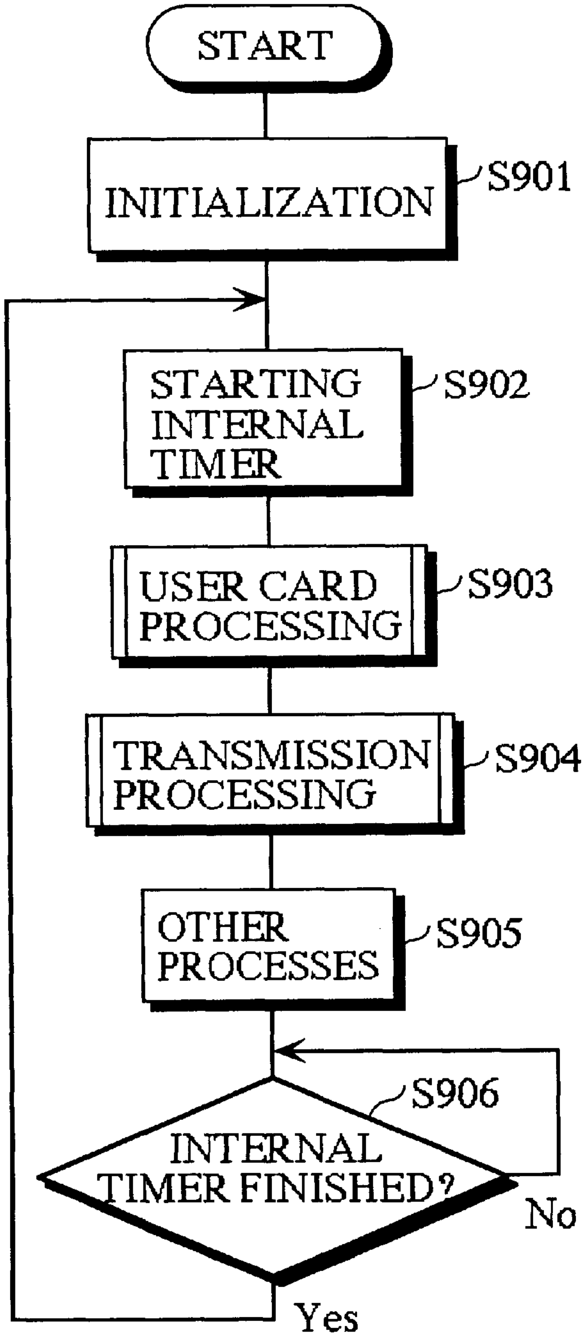
FIG. 19A is a flowchart showing the main processing performed by the management terminal.
Figure 19B:
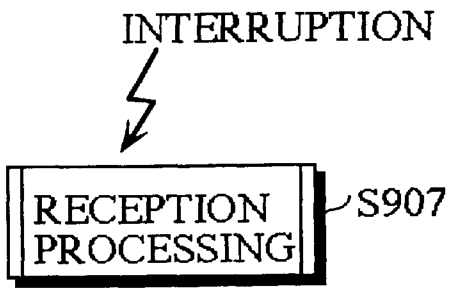
FIG. 19B shows the reception processing as an interrupt processing performed by the management terminal.

The following is a description of the operation performed by the management terminal 1. FIGS. 19A and 19B are flowcharts showing the processing performed by the CPU 101 of the management terminal 1. FIG. 19A shows the main routine, while FIG. 19B shows the reception processing which takes priority over the main routine.

(3-2-3a) Main Routine

After initialization of the management terminal 1 (step S901), the CPU 101 starts timing using an internal timer (step S902). Then, user card processing and transmission processing are performed (steps S903 and S904), and other processed are performed (step S905). After this, the CPU 101 waits for the internal timer to finish (step S906) and returns to step S902 to repeat the processing described above. Detailed explanations of these steps and the reception processing are given below.

(3-2-3b) User Card Processing

Figure 20:
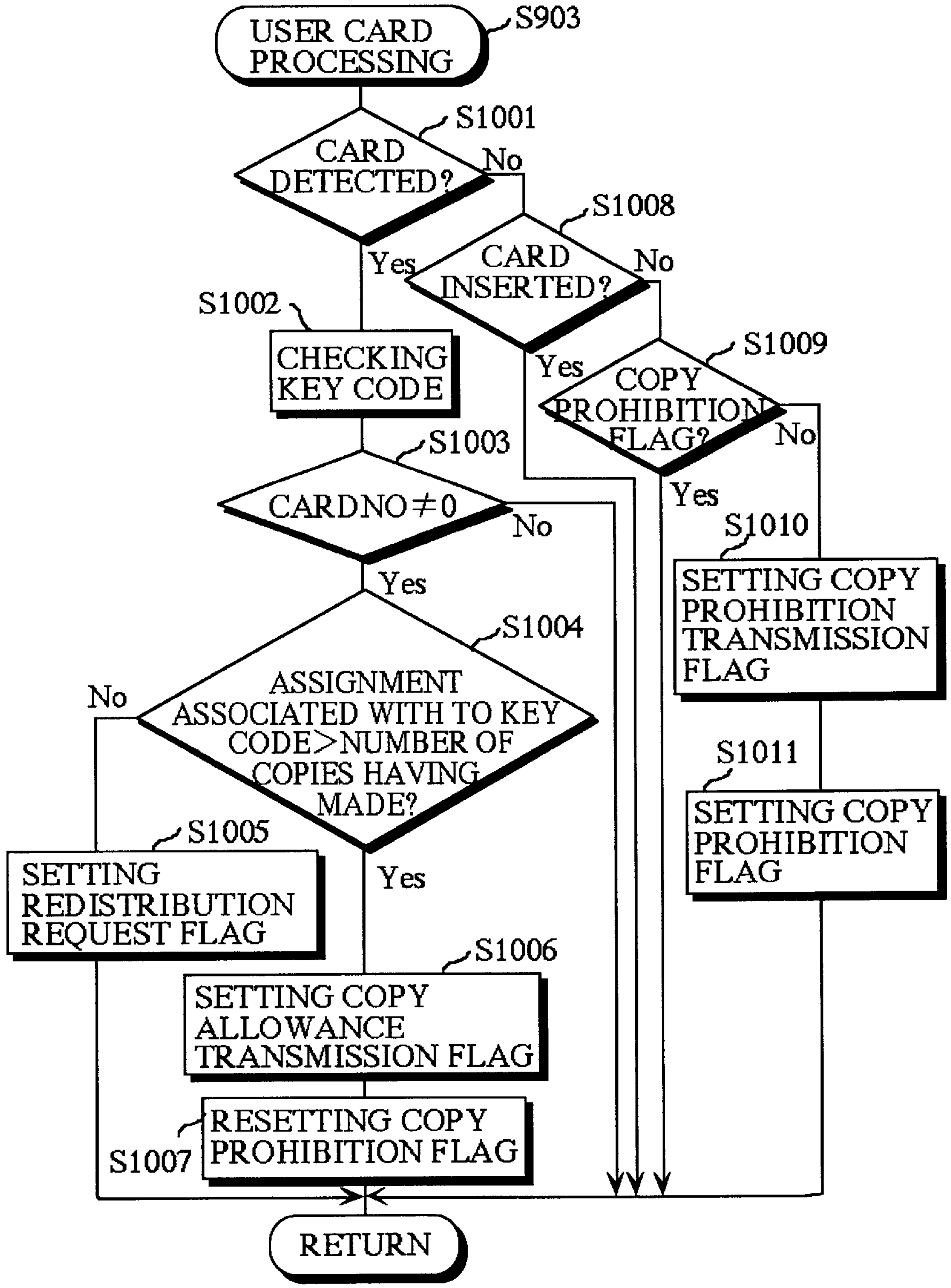
FIG. 20 is a flowchart showing the user card processing performed by the management terminal.

FIG. 20 is the detailed flowchart showing the operation for the user card processing. The card processing unit 10*a* detects whether the user card C has been inserted into the card reader R (step S1001). If the user card C is detected, the card processing unit 10*a* has the card reader R read the key code recorded on the user card C and compares the read key code with key codes previously stored in the number counting unit 10*d* to determine if there is a match. If there is, the key code is set at the “card number value” which is set as a variable. If there is not, “0” is set at the “card number value” (step S1002). The card processing unit 10*a* judges whether “0” is set at the “card number value” (step S1003). If “0” is set, the processing is terminated.

If “0” is not set at the “card number value”, the number judging unit 10*c* compares the assignment associated with the key code which is set at the “card number value” with the number of copies having been made by the user represented by the key code stored in the registration table T (step S1004). When the number of copies having been made reaches the assignment, this means that the request for the redistribution of the number of copies needs to be transmitted to the host computer 90. As such, the number judging unit 10*c* sets the redistribution request flag (step S1005) and terminates the processing. Meanwhile, when the number of copies having been made does not reach the assignment, the number judging unit 10*c* sets the copy allowance transmission signal (step S1006). If the copy prohibition flag is set, the number judging unit 10*c* resets the copy prohibition flag (step S1007) and terminates the processing.

When the card processing unit 10*a* does not detect the user card C in S1001, this means that the user card C was inserted and left as it is, or that the user card C has not been inserted into the card reader R. As such, the card processing unit 10*a* judges whether the user card C is currently inserted into the card reader R (step S1008). If it is, this means that the user who possesses the user card C inputs settings to the copier 4, leaving the user card C in the card reader R, or that the copier 4 is currently operating. Therefore, the card processing unit 10*a* takes no action.

If the user card C is not currently inserted in the card reader R in S1008, this means that the copy prohibition flag needs to be set. As such, the card processing unit 10*a* judges whether the copy prohibition flag is set (step S1009). If it is, the card processing unit 10*a* terminates the processing. If it is not, the user card C is judged to be withdrawn from the card reader R, the card processing unit 10*a* sets the copy prohibition transmission flag to prohibit the copier 4 to perform the copy operation (step S1010), as well as setting the copy prohibition flag (step S1011). Then, the processing is terminated.

(3-2-3c) Reception Processing

Figure 21:
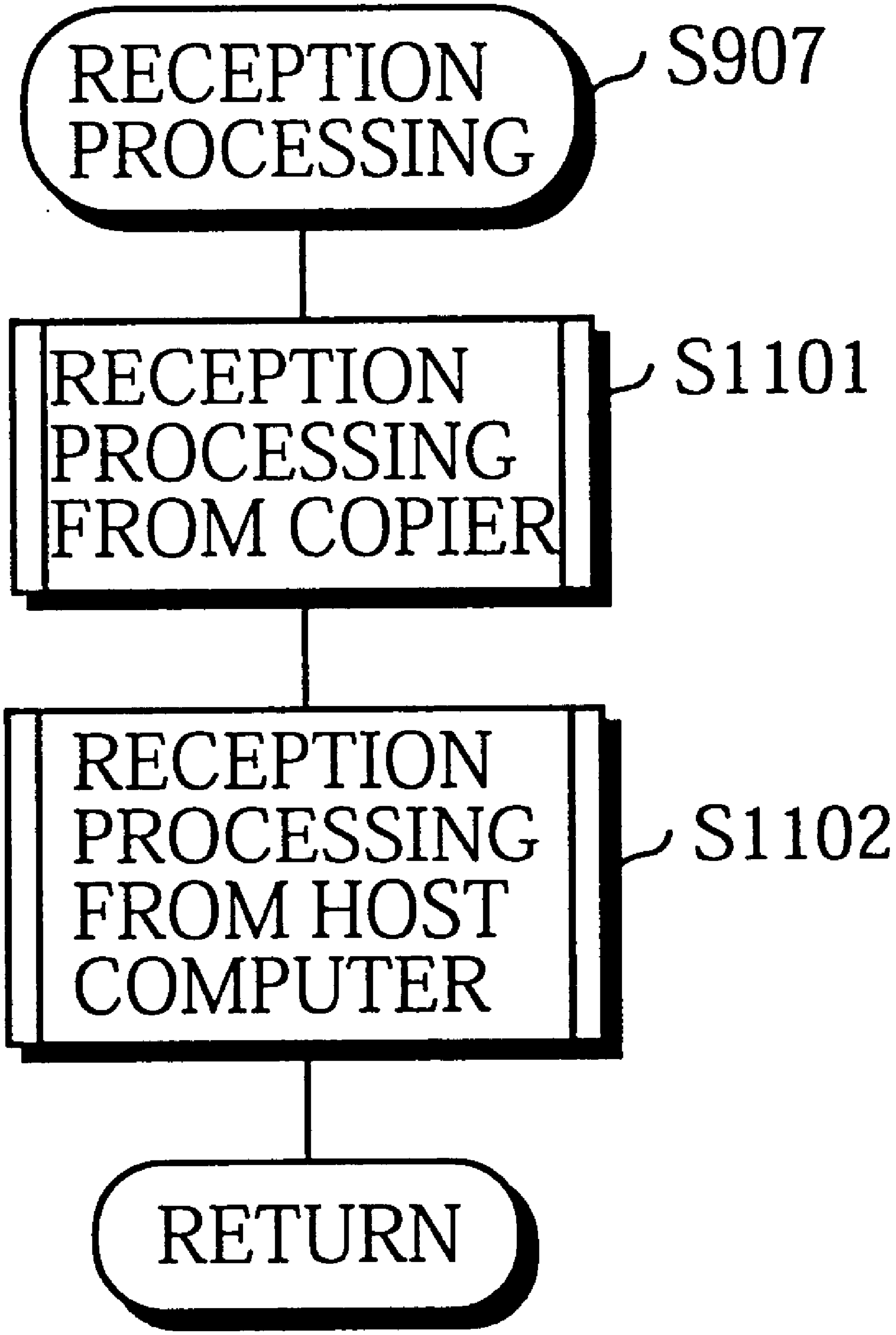
FIG. 21 is a flowchart showing the reception processing performed by the management terminal.

Next, the reception processing is explained, with reference to the flowchart of FIG. 21. As shown in FIG. 21, the reception processing from the copier 4 (step S1101) and the reception processing from the host computer 90 (step S1102) are performed.

Figure 22:
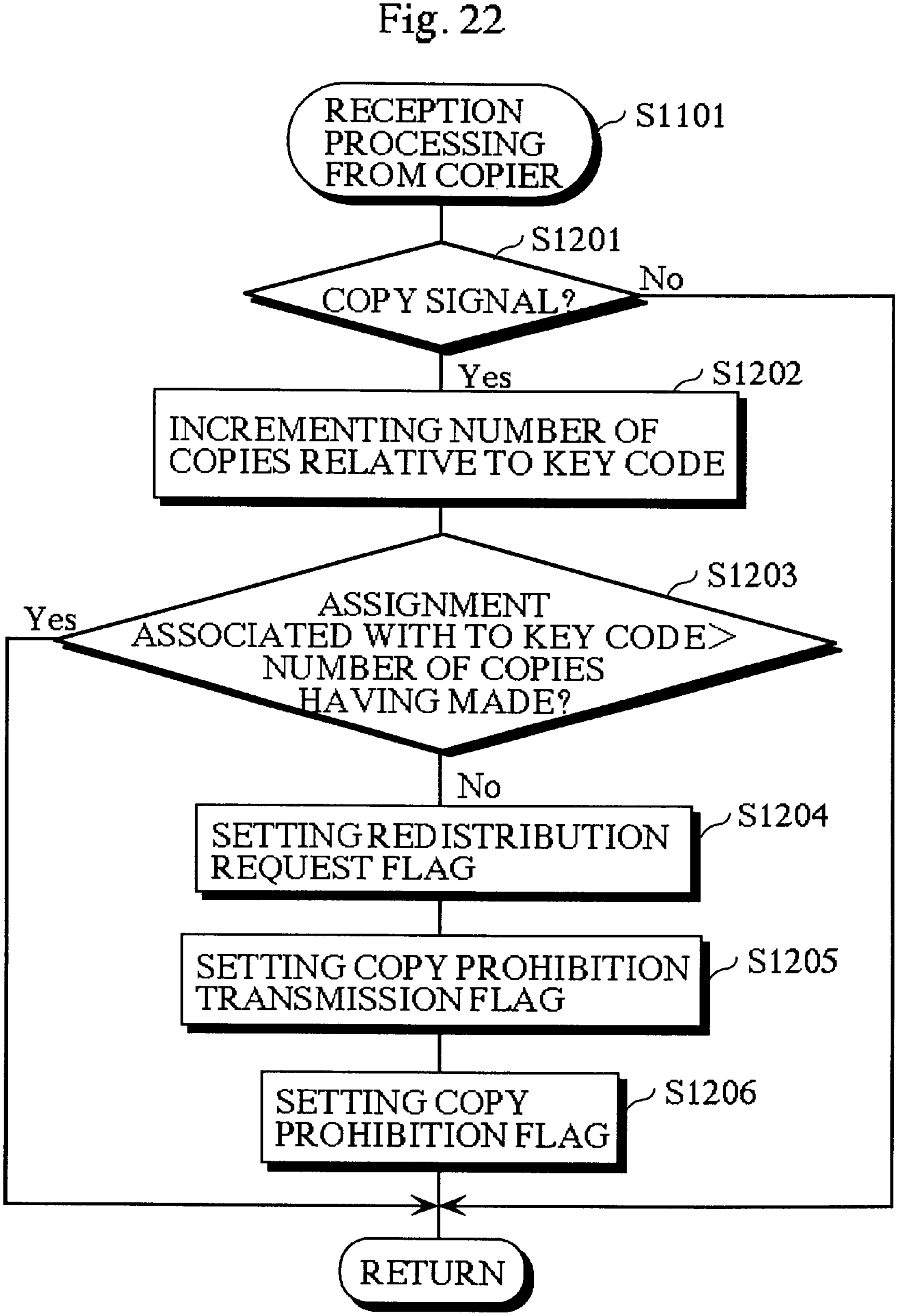
FIG. 22 is a flowchart showing the reception processing from the copier performed by the management terminal.

The reception processing from the copier 4 is first explained. As described above, the copy signal is transmitted from the copier 4. FIG. 22 is the detailed flowchart showing the reception processing from the copier 4. The number counting unit 10*d* judges whether the copy signal has been transmitted from the copier 4 (step S1201). If not, the processing is terminated. If it has, the number counting unit 10*d* increments the number of copies associated with the key code set at the “card number value”, out of the key codes registered in the registration table T (step S1202). In accordance with the increment result, the number judging unit 10*c* judges whether the number of copies having been made by the user represented by the key code reaches the assignment (step S1203). If it does not, the processing is terminated. If it does, the number judging unit 10*c* sets the redistribution request flag, the copy prohibition transmission flag, and the copy prohibition flag (steps S1203 to S1206) and terminated the processing.

Figure 23:
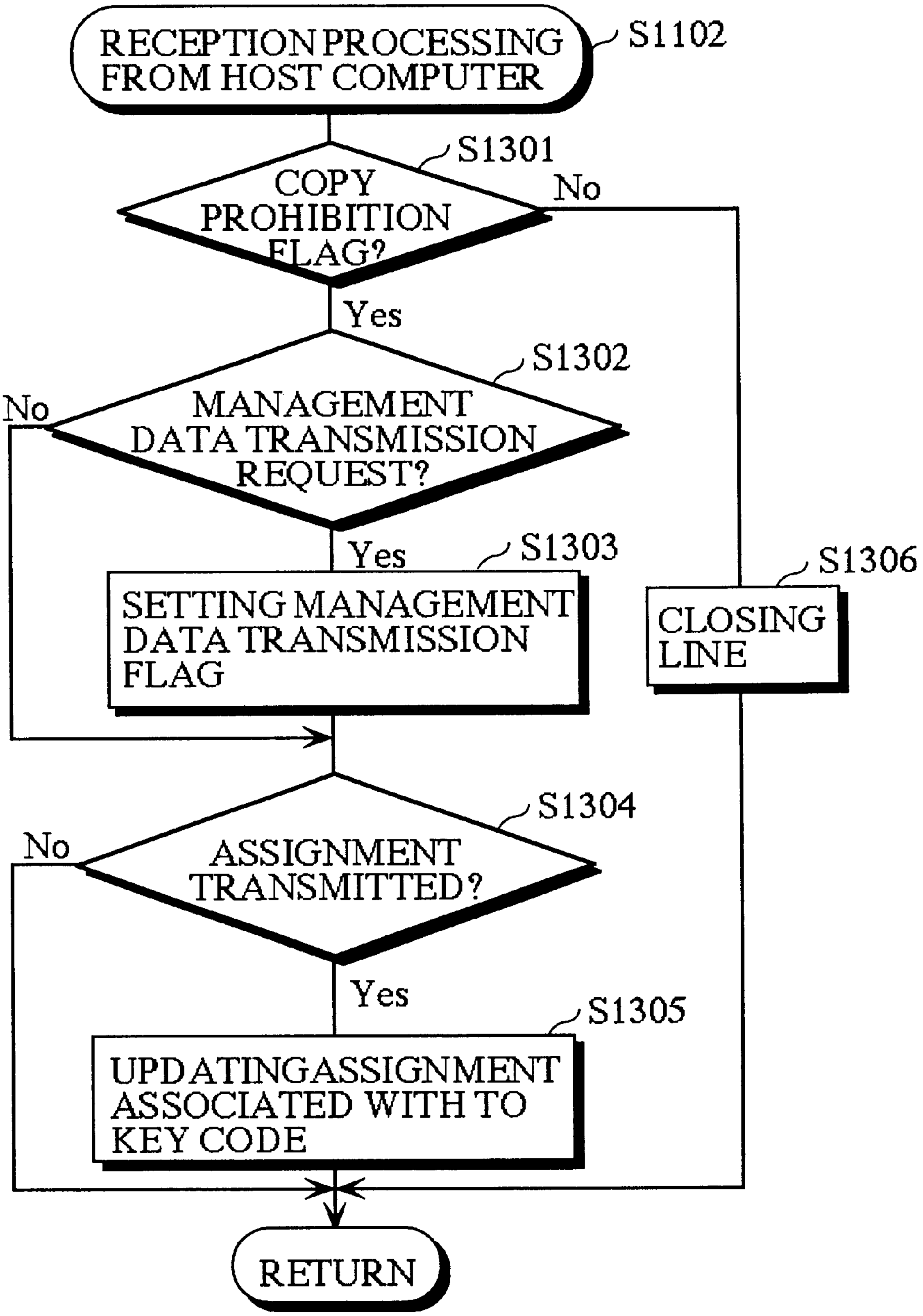
FIG. 23 is a flowchart showing the reception processing from the host computer performed by the management terminal.

Next, the reception processing from the host computer 90 is explained. As described above, the assignment and the management data transmission request are transmitted from the host computer 90. FIG. 23 is the flowchart showing the reception processing from the host computer 90. The reception control unit 20 judges whether the copy prohibition flag is set (step S1301). If it is not, this means that the copy operation is being currently performed. Therefore, the reception control unit 20 neglects the transmission of the assignment and the management data X from the host computer 90. In other words, the reception control unit 20 close the line connected with the host computer 90 (step S1306). If the copy prohibition flag is set in S1301, the management data request reception unit 20*b* judges whether the management data transmission request has been received (step S1302). When it has, the management data request reception unit 20*b* sets the management data transmission flag for the corresponding key code. When is has not, the management data request reception unit 20*b* proceeds to the next step without setting the management data transmission flag. The number reception unit 20*a* judges whether the distribution number of copies has been received (step S1304). If it has not, the processing is terminated. If it has, the number reception unit 20*a* updates the assignment associated with to the key code stored in the number judging unit 10*c*, and terminates the processing.

(3-2-3d) Transmission Processing

Figure 24:
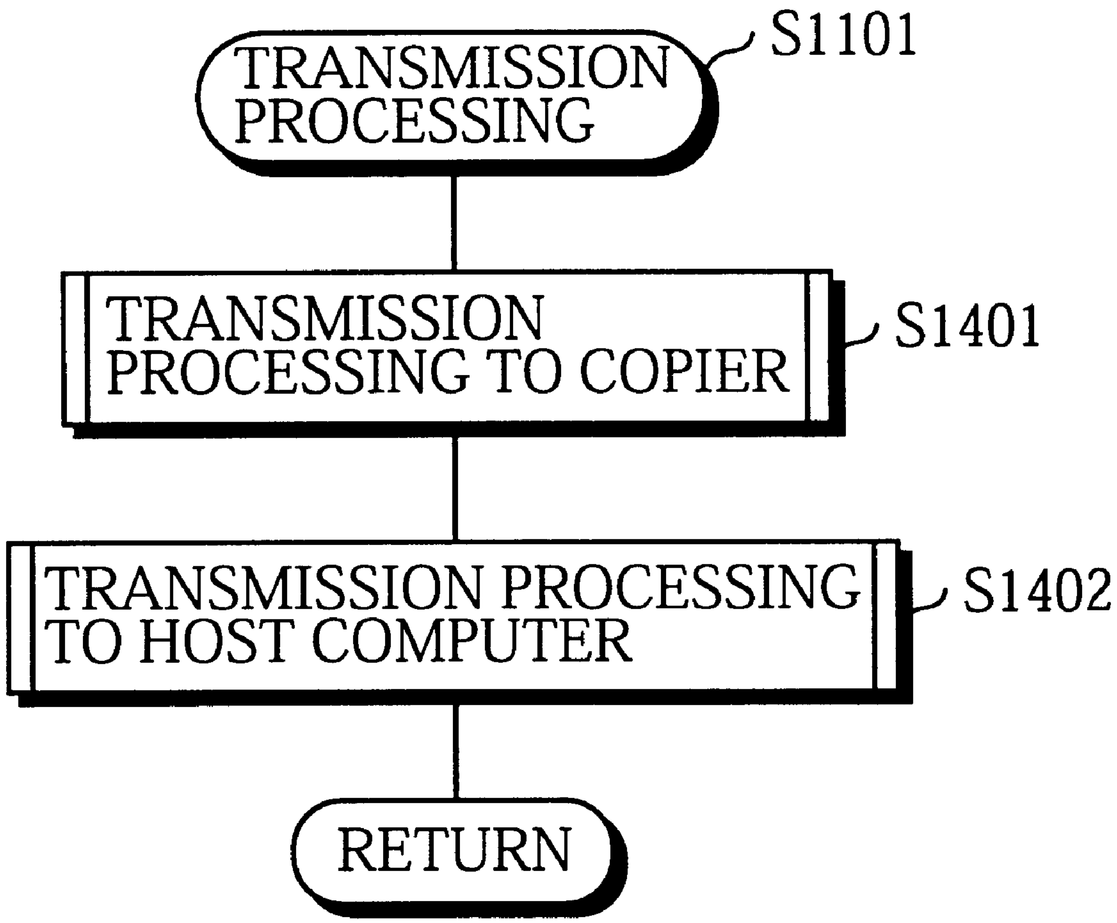
FIG. 24 is a flowchart showing the transmission processing performed by the management terminal.

FIG. 24 is the flowchart showing the transmission processing, in which transmission processing to the copier 4 (step S1401) and transmission processing to the host computer 90 (step S1402) are performed.

Figure 25:
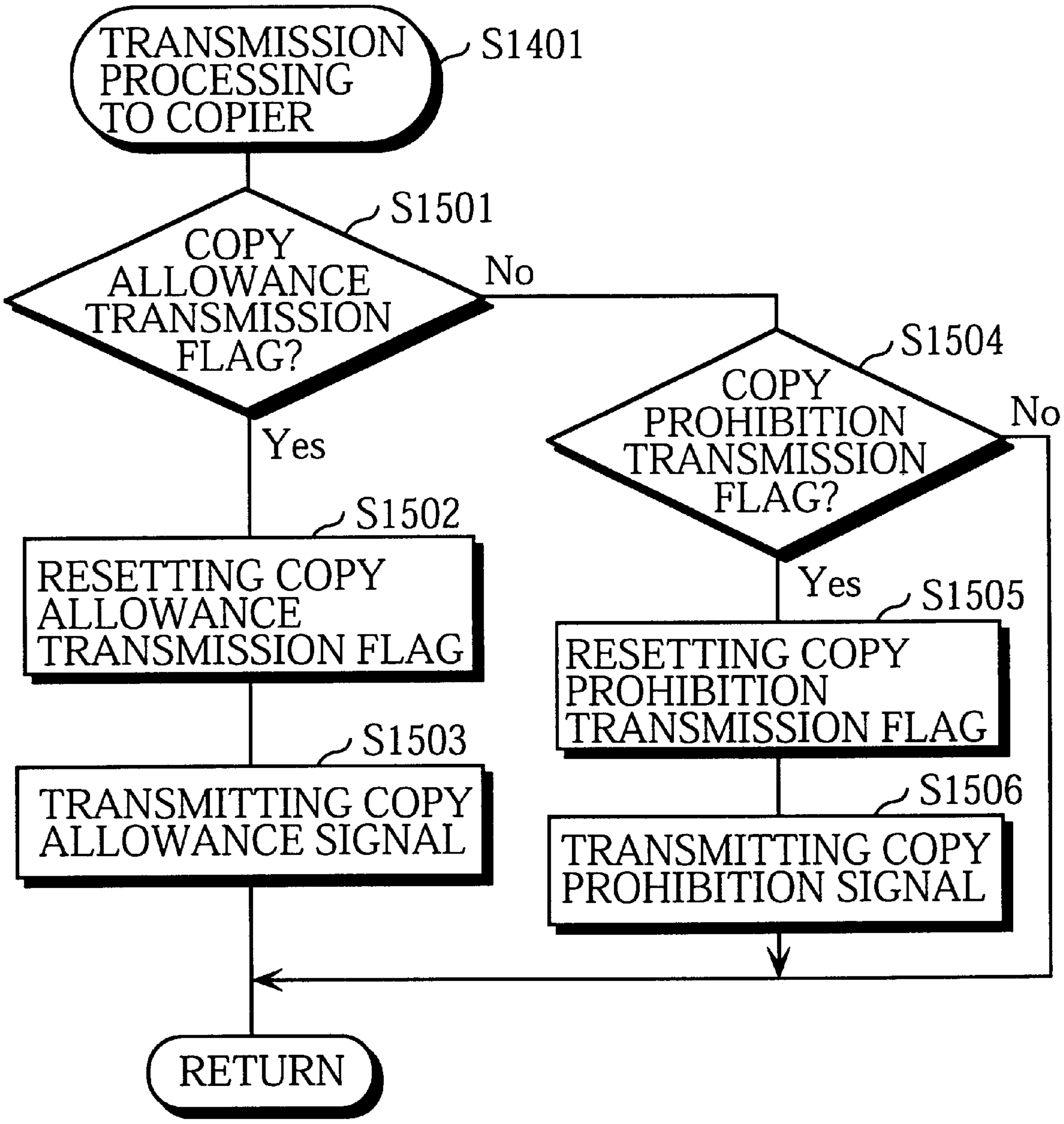
FIG. 25 is a flowchart showing the transmission processing to the copier performed by the management terminal.

The transmission processing to the copier 4 is first explained. As described above, the copy allowance signal and the copy prohibition signal are transmitted to the copier 4. FIG. 25 is the flowchart showing the transmission processing to the copier 4. The copier control unit 10*b* judges whether the copy allowance transmission flag is set (step S1501). If so, the copier control unit 10*b* resets the copy allowance transmission flag (step S1502) as well as transmitting the copy allowance signal to the copier 4 (step S1503). If the copy allowance transmission flag is not set in S1501, the copier control unit 10*b* judges whether the copy prohibition transmission flag is set (step S1504). If it is not, the copier control unit 10*b* takes no action and terminates the processing. If it is, the copier control unit 10*b* resets the copy prohibition transmission flag (step S1505) as well as transmitting the copy prohibition signal to the copier 4 (step S1506).

Figure 26:
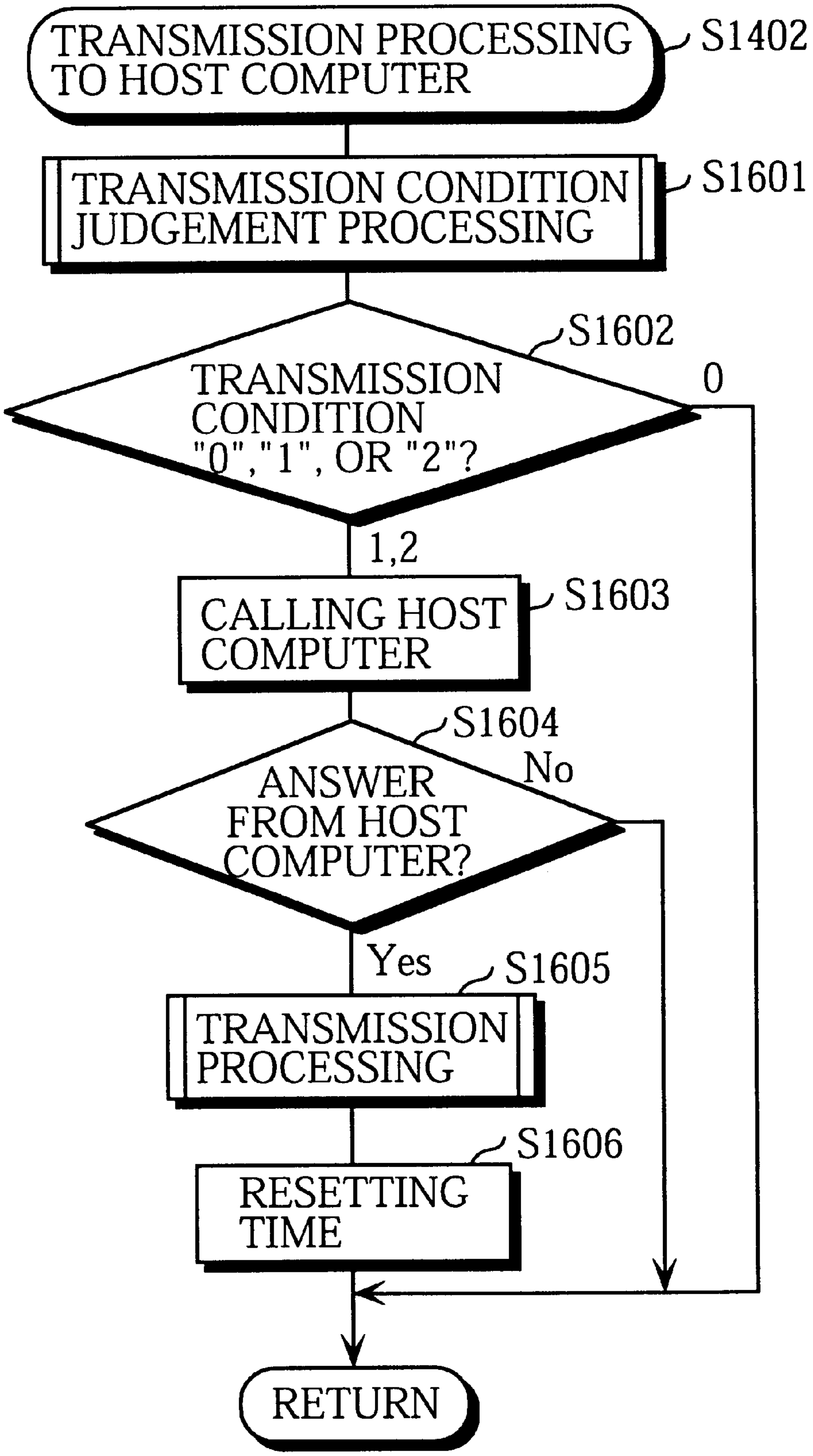
FIG. 26 is a flowchart showing the transmission processing to the host computer performed by the management terminal.

Next, the transmission processing to the host computer 90 is explained. As described above, the redistribution request and the management data X are transmitted to the host computer 90. FIG. 26 is the flowchart showing the transmission processing to the host computer 90. The transmission condition judging unit 30*a* performs the transmission condition judgement processing (step S1601), in which the value of the state counter indicating a transmission condition is set. The transmission condition judging unit 30*a* judges whether the transmission condition is set at "0", "1", or "2". As explained above, the value "1" indicates that only the management data X is to be transmitted and the value "2" indicates that the management data X and the redistribution request are to be transmitted, while the value "0" indicates other cases. This transmission condition judgement processing is described in detail later in this specification.

When the value of the transmission condition is set, the transmission control unit 30 judges what value is set (step S1602). If it is set at "0", the processing is terminated. If it is set at "1" or "2", the transmission control unit 30 calls the host computer 90 via the communication line (step S1603). If the host computer does not answer within a predetermined period of time, the processing is terminated. If it does, the transmission control unit 30 performs the transmission processing (step S1605) which is explained in detail later in this specification. Here, if the current time has passed a predetermined time, on which the the management data X stored in the transmission condition judging unit 30*a* is to be transmitted, the transmission control unit 30 sets the next predetermined time as the transmission time.

Figure 27:
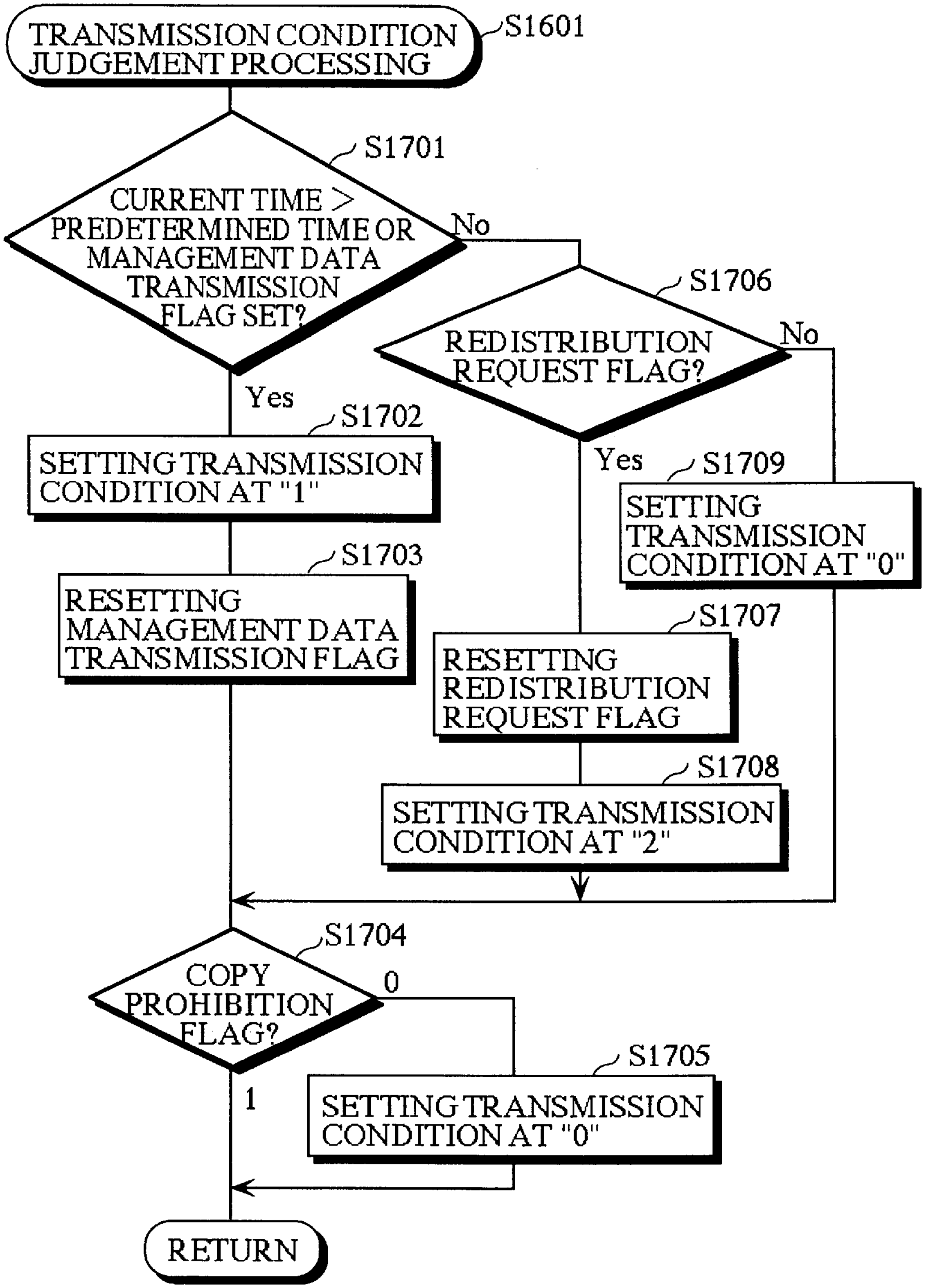
FIG. 27 is a flowchart showing the transmission condition judgement processing performed by the management terminal.

Next, the transmission condition judgement processing of the transmission processing to the host compute 90 is explained. FIG. 27 is the detailed flowchart showing the transmission condition judgement processing. The transmission condition judging unit 30*a* judges whether the current time has passed the predetermined time and whether the management data transmission flag is set (step S1701). If the current time has passed the predetermined time or the management data transmission flag is set, the transmission condition judging unit 30*a* sets the transmission condition at "1" (step S1702). If the the management data transmission flag is set, the transmission condition judging unit 30*a* resets the management data transmission flag (step S1703). Meanwhile, if the current time has not passed the predetermined time and the management data transmission flag is not set, the transmission condition judging unit 30*a* judges whether the redistribution request flag is set (step S1706). If it is, the transmission condition judging unit 30*a* resets the redistribution request flag (step S1707) and sets the transmission condition at "2". If the redistribution request flag is not set, the transmission condition is set at "0". After this, the transmission condition judging unit 30*a* judges whether the copy prohibition flag is set (step S1704). If it is, the processing is terminated. If it is not, this means that the copy operation is being currently performed and that data stored in the registration table T of the number counting unit 10*d* is being updated. In this case, if the transmission condition is not set at "0", the transmission condition judging unit 30*a* sets it at "0" and terminates the processing.

Figure 28:
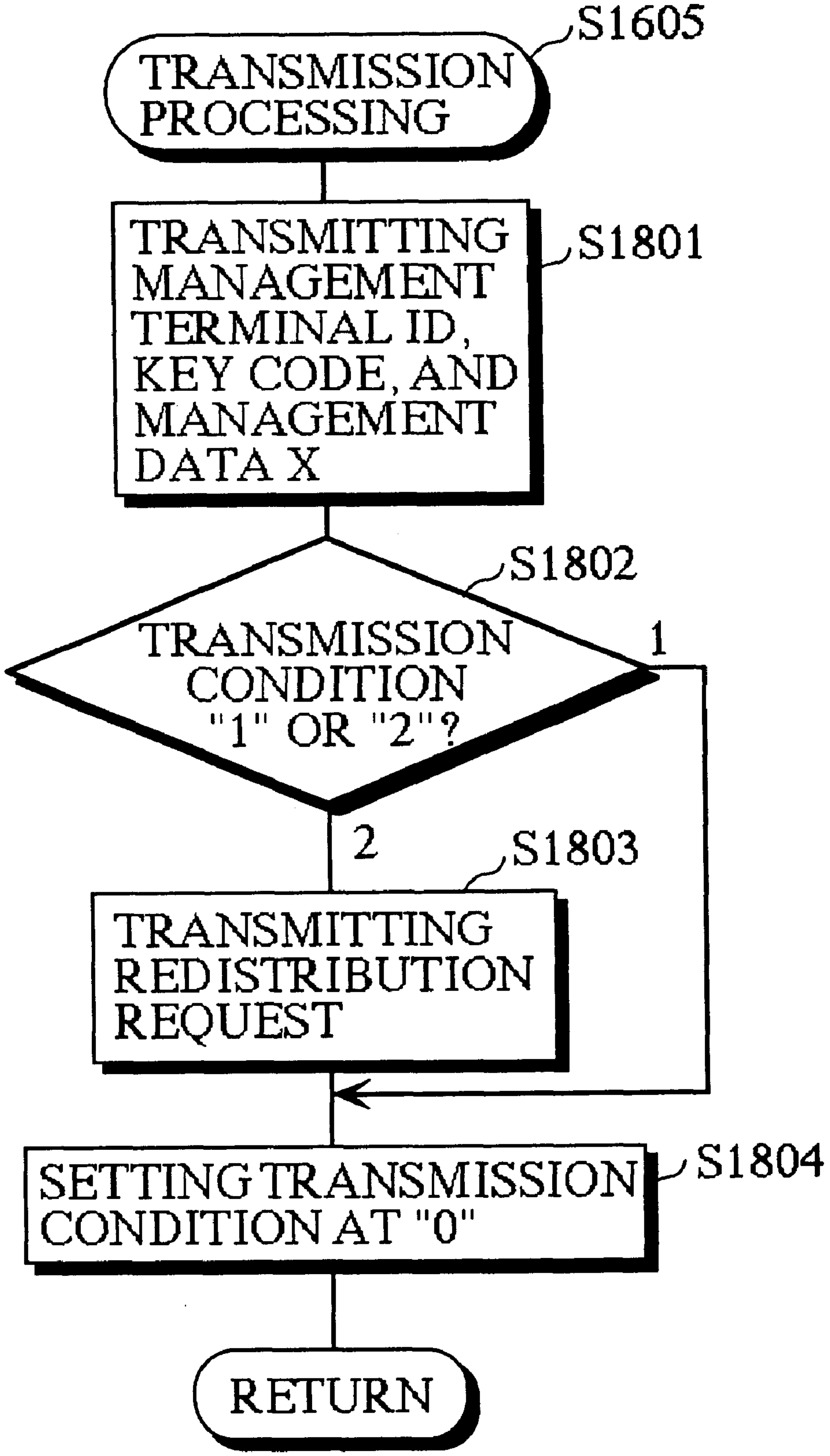
FIG. 28 is a flowchart showing the transmission processing performed by the management terminal.

The transmission processing to the host computer 90 in S1605 shown in FIG. 26 is explained. FIG. 28 is the detailed flowchart showing the transmission processing. As described above, the transmission processing is performed after the line connected with the host computer 90 is opened, with the transmission condition being set at "1" or "2". The management data request transmission control unit 30*c* unconditionally transmits the management terminal ID of the management terminal 1 and all the management data X generated by the management data generation unit 10*e* (step S1801). The management data request transmission control unit 30*c* next judges whether the transmission condition is set at "1" or "2" (step S1802). If set at "1", the processing is terminated, with the transmission condition being considered as "0". If set at "2", the redistribution request transmission control unit 30*b* transmits the redistribution request for the user represented by the key code recorded in the "card number value" (step S1803). Then, the processing is terminated, with the transmission condition being considered as "0" (step S1804).

(4) Modifications

In the present embodiment, a management system which manages the number of copies performed by the copier is described, although it should be noted here that the present invention can be applied to the management of the number of image formations in an image forming apparatus such as a printer or a facsimile machine. While the number of image formations, such as the number of copies, allocated to each user, is managed in the present embodiment, it is also possible to manage fee for image formation allocated to each user.

Although the management terminal of the copier transmits the redistribution request to the host computer when the assignment allocated to a specific user becomes zero in the present embodiment, the management terminal of the copier may transmits the redistribution request such as when the remaining number of copies is below a predetermined number, when the number of copies having been made by the user reaches the predetermined number, and when the fee for the copies made by the user reaches a predetermined figure.

In the present embodiment, after the current remaining number of copies is redistributed, the user can easily refer to the total number of copies having been made within the certain period of time since the reassignment includes the number of copies having been made. It is also possible that the reassignment without including the number of copies having been made may be transmitted to the management terminal, which may then count the number of copies made after the redistribution by the user and compare the counted number with the reassignment.

It should be noted here that a program executed by the host computer 90 can be installed in other computer systems by storing the program on a storage medium, such as a floppy disk.

Figure 29:
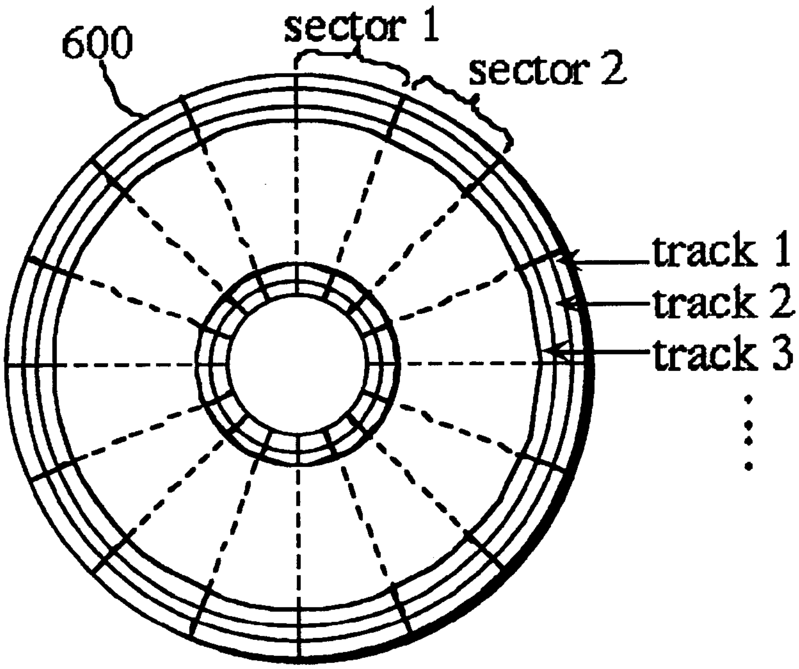
FIG. 29 shows a storage area of a floppy disk storing the management program of the host computer.
Figure 30:
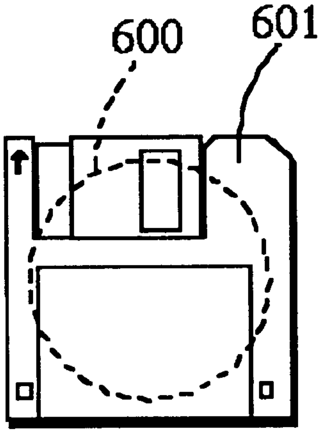
FIG. 30 shows how a floppy disk is enclosed in a case.

Taking a floppy disk as an example, the following is a description of the construction of the record medium, with reference to FIGS. 29 and 30.

FIG. 29 shows a format example of a floppy disk 600 which is a storage medium. As shown in FIG. 29, numbered tracks 1, 2, . . . are concentrically formed from the outer radius to the inner radius, each track being divided into a plurality of sectors 1, 2, . . . of a predetermined angle. The stated program is stored in accordance with these divided storage areas.

FIG. 30 shows the front view of the case 601 of the floppy disk 600. The floppy disk 600 is enclosed in the case 601 to protect it from external physical shocks and dust so that important data is protected.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. A management apparatus which is connected to a plurality of image forming apparatuses via a communication line and manages an amount of image formations performed by at least one of users using the plurality of image forming apparatuses, the management apparatus comprising:

an amount of image formations distribution unit for distributing an amount of image formations allocated to a specific user among the plurality of image forming apparatuses in accordance with a first ratio; and a distributed amount transmission unit for transmitting a respective distributed amount of image formations to each image forming apparatus.

2. The management apparatus of claim 1, wherein the distributed amount transmission unit transmits the respective distributed amount of image formations together with identification information of the specific user to each image forming apparatus.

3. The management apparatus of claim 1, wherein the amount of image formations distribution unit determines the first ratio in accordance with a past use record of the specific user for each of the plurality of image forming apparatuses.

4. The management apparatus of claim 1, wherein the amount of image formations distribution unit determines the first ratio for the specific user so that at least a predetermined amount of image formations are distributed to each image forming apparatus.

5. The management apparatus of claim 1, wherein the amount of image formations is a number of image formations.

6. The management apparatus of claim 1 further comprising:

a detection unit for detecting a reception of a redistribution request issued for the specific user, with the redistribution request being transmitted from one of the plurality of image forming apparatuses;

an amount of image formations redistribution unit for redistributing the amount of image formations previously allocated to the specific user among the plurality of image forming apparatuses according to a second ratio when the reception of the redistribution request is detected; and a redistributed amount transmission unit for transmitting a respective redistributed amount of image formations to each image forming apparatus.

7. The management apparatus of claim 6, wherein the redistributed amount transmission unit transmits the respective redistributed amount of image formations together with identification information of the specific user to each image forming apparatus.

8. The management apparatus of claim 6, wherein the redistributed amount transmission unit first transmits the redistributed amount of image formations which is lower than a corresponding distributed amount of image formations before redistribution to a corresponding image forming apparatus.

9. The management apparatus of claim 6 further comprising:

an accumulation unit for accumulating an amount of image formations that have been made by the specific user using the plurality of image forming apparatuses when the reception of the redistributed request is detected; and a remaining amount calculation unit for calculating a remaining amount of image formations that the specific user is allowed to make in accordance with the amount of image formations accumulated by the accumulation unit, and wherein the amount of image formations redistribution unit distributes the amount of image formations previously allocated to the specific user among the plurality of image forming apparatuses in accordance with the remaining amount of image formations that the specific user is allowed to make.

10. The management apparatus of claim 1, wherein the amount of image formations allocated to a specific user is the number of image formations that the specific user is authorized to make in a predetermined period of time.

11. An image forming apparatus which is connected to a management apparatus via a communication line, comprising:

a storage unit for storing a distributed amount of image formations associated with a specific user, with the distributed amount of image formations being transmitted from the management apparatus;

an amount of image formations counting unit for counting an amount of image formations made by the specific user using the image forming apparatus;

a prohibiting unit for prohibiting the specific user from using the image forming apparatus when an amount of image formations counted by the amount of image formations counting unit reaches the distributed amount of image formations stored in the storage unit;

a redistribution request transmission unit for transmitting a redistribution request together with identification information of the specific user to the management apparatus when the amount of image formations counted by the amount of image formations counting unit reaches the distributed amount of image formations; and an updating unit for updating the distributed amount of image formations stored in the storage unit to a redistributed amount of image formations transmitted from the management terminal in response to the redistribution request.

12. The image forming apparatus of claim 11, each further comprising a use record transmission unit for transmitting a use record of the specific user in response to a report request of the use record of the specific user, with the report request being transmitted from the management apparatus.

13. The image forming apparatus of claim 11, wherein the storage unit stores the distributed amount of image formations for each of a plurality of users.

14. The image forming apparatus of claim 11, each further comprising:

an identifier reception unit for receiving an input of an identifier of a user; and an allowing unit for allowing the specific user to use the image forming apparatus only when the specific user is identified as one of the plurality of users who are registered beforehand by referring to an inputted identifier of the specific user and the prohibiting unit does not prohibit the user from using the image forming apparatus.

15. The image forming apparatus of claim 11, wherein the amount of image formations associated with a specific user is the number of image formations that the specific user is authorized to make in a predetermined period of time.

16. A management system where a plurality of image forming apparatuses are connected to a management apparatus via a communication line, for managing an amount of image formations made by a specific user, wherein the management apparatus comprises:

an amount of image formations distribution unit for distributing an amount of image formations allocated to a specific user among the plurality of image forming apparatuses in accordance with a first ratio; and a distributed amount transmission unit for transmitting a respective distributed amount of image formations to each image forming apparatus, and wherein each image forming apparatus comprises:

a storage unit for storing a distributed amount of image formations associated with a specific user, with the distributed amount of image formations being transmitted from the management apparatus;

an amount of image formations counting unit for counting an amount of image formations made by the specific user using the image forming apparatus; and a prohibiting unit for prohibiting the specific user from using the image forming apparatus when an amount of image formations counted by the amount of image formations counting unit reaches the distributed amount of image formations stored in the storage unit.

17. The management system of claim 16, wherein the image forming apparatus further comprises a redistribution request transmission unit for transmitting a redistribution request for the specific user to the management apparatus when the amount of image formations counted by the amount of image formations counting unit reaches the distributed amount of image formations stored in the storage unit, and wherein the management apparatus further comprises:

an amount of image formations redistribution unit for redistributing the amount of image formations previously allocated to each user among the plurality of image forming apparatuses according to a second ratio in response to the redistribution request; and a redistributed amount of image formations transmission unit for transmitting a respective redistributed amount of image formations to each image forming apparatus.

18. The management system of claim 17, wherein the redistributed amount transmission unit first transmits the redistributed amount of image formations which is lower than a corresponding distributed amount of image formations before redistribution to a corresponding image forming apparatus.

19. A management method for a management apparatus which is connected to a plurality of image forming apparatuses via a communication line and manages an amount of image formations performed by at least one of users using the plurality of image forming apparatuses, the management method including:

an amount of image formations distribution step for distributing an amount of image formations allocated to a specific user among the plurality of image forming apparatuses in accordance with a first ratio; and a distributed amount transmission step for transmitting a respective distributed amount of image formations to each image forming apparatus.

20. The method of claim 19, wherein the amount of image formations allocated to a specific user is the number of image formations that the specific user is authorized to make in a predetermined period of time.

21. A storage medium which stores a control program executed by a management apparatus which is connected to a plurality of image forming apparatuses via a communication line and manages an amount of image formations performed by at least one of users using the plurality of image forming apparatuses, the control program including:

an amount of image formations distribution step for distributing an amount of image formations allocated to a specific user among the plurality of image forming apparatuses in accordance with a first ratio; and a distributed amount transmission step for transmitting a respective distributed amount of image formations to each image forming apparatus.

22. The storage medium of claim 21, wherein the amount of image formations allocated to a specific user is the number of image formations that the specific user is authorized to make in a predetermined period of time.

* * * * *